(12) United States Patent
Lusted et al.

(10) Patent No.: US 9,112,722 B2
(45) Date of Patent: Aug. 18, 2015

(54) PMA-SIZE TRAINING FRAME FOR 100GBASE-KP4

(71) Applicant: INTEL CORPORATION, Santa Clara, CA (US)

(72) Inventors: Kent C. Lusted, Aloha, OR (US); Adee O. Ran, Maayan Baruch (IL)

(73) Assignee: Intel Corporation, Santa Clara, CA (US)

( * ) Notice: Subject to any disclaimer, the term of this patent is extended or adjusted under 35 U.S.C. 154(b) by 73 days.

(21) Appl. No.: 13/870,186

(22) Filed: Apr. 25, 2013

(65) Prior Publication Data

US 2014/0146833 A1    May 29, 2014

Related U.S. Application Data

(60) Provisional application No. 61/731,344, filed on Nov. 29, 2012.

(51) Int. Cl.
*H04L 12/413* (2006.01)
*H04L 7/10* (2006.01)

(52) U.S. Cl.
CPC ............... *H04L 12/413* (2013.01); *H04L 7/10* (2013.01)

(58) Field of Classification Search
None
See application file for complete search history.

(56) References Cited

U.S. PATENT DOCUMENTS

| | | | |
|---|---|---|---|
| 3,882,494 A | 5/1975 | Bolger | |
| 4,158,193 A | 6/1979 | D'Antonio | |
| 6,731,692 B1 * | 5/2004 | Bhoja | 375/286 |
| 8,259,760 B2 | 9/2012 | Chiabrera | |
| 8,307,265 B2 | 11/2012 | Ganga et al. | |
| 8,665,929 B1 | 3/2014 | Lida et al. | |
| 2003/0194016 A1 | 10/2003 | Gorecki et al. | |
| 2003/0207675 A1 | 11/2003 | Hughes et al. | |
| 2005/0135413 A1 | 6/2005 | Yang et al. | |
| 2005/0141633 A1 | 6/2005 | Lu | |
| 2007/0076722 A1 * | 4/2007 | Ungerboeck et al. | 370/395.2 |

(Continued)

FOREIGN PATENT DOCUMENTS

WO  2007/133937 A2  11/2007
WO  2013/191912 A1  12/2013

OTHER PUBLICATIONS

Lusted et al., "100GBASE-KP4 Training Idea," IEEE 802.3bj, Jul. 2012, pp. 1-42.*

(Continued)

*Primary Examiner* — Donald Mills
(74) *Attorney, Agent, or Firm* — Law Office of R. Alan Burnett, P.S.

(57) ABSTRACT

Methods, apparatus and systems for implementing Physical Media Attachment (PMA) alignment and rapid transition from a link training mode to a data mode for next-generation high-speed Ethernet links including a 100 Gbps Ethernet link. Training frames are transmitted between first and second Ethernet interfaces on opposing ends of the link in a pair-wise manner, with a first training frame being sent from a first Ethernet interface and a second training frame being returned from the second Ethernet interface. The training frames have a length that is the same as the length of Physical Media Attachment (PMA) frames, and the returned training frames include receiver readiness status indicia identifying a readiness status of a local receiver port, and countdown data. The readiness status indicia, and countdown data are employed to facilitate a rapid transition from the link training mode to the data mode.

30 Claims, 27 Drawing Sheets

(56) References Cited

U.S. PATENT DOCUMENTS

| | | | |
|---|---|---|---|
| 2008/0165888 A1 | 7/2008 | Wiggins et al. | |
| 2009/0187778 A1 | 7/2009 | Diab et al. | |
| 2009/0219978 A1 | 9/2009 | Mobin et al. | |
| 2009/0245448 A1 | 10/2009 | Ran et al. | |
| 2010/0046543 A1* | 2/2010 | Parnaby | 370/465 |
| 2010/0229071 A1* | 9/2010 | Ganga et al. | 714/776 |
| 2011/0080972 A1 | 4/2011 | Xi et al. | |
| 2012/0063295 A1* | 3/2012 | Bliss | 370/216 |
| 2013/0343400 A1* | 12/2013 | Lusted et al. | 370/419 |
| 2014/0086264 A1* | 3/2014 | Lusted et al. | 370/470 |
| 2014/0223265 A1 | 8/2014 | Lusted et al. | |

OTHER PUBLICATIONS

Office Action received for the Japanese Patent Application No. 2013-195546, mailed on Apr. 8, 2014, 3 pages of English Translation and 3 pages of Japanese Office Action.

Office Action received for Japanese Patent Application No. 2013-241930, mailed on Jan. 20, 2015, 3 pages of English Translation and 3 pages of Japanese Office Action.

International Search Report and Written Opinion received for PCT Patent Application No. PCT/US2013/044369, mailed on Sep. 5, 2013, 11 pages.

International Preliminary Report on Patentability and Written Opinion received for PCT Patent Application No. PCT/US2013/044369, mailed on Dec. 31, 2014, 8 pages.

* cited by examiner

PAM4 Encoding

3 ⟹ +1
2 ⟹ +1/3
1 ⟹ -1/3
0 ⟹ -1

| Cell(s) | Name | Description |
|---|---|---|
| 15:14 | Reserved | Transmitted as 0, ignored on reception |
| 13 | Preset | 1 = Preset coefficients<br>0 = Normal operation |
| 12 | Initialize | 1 = Initialize coefficients<br>0 = Normal operation |
| 11:07 | Reserved | Transmitted as 0, ignored on reception |
| 6 | Parity Check | Parity check for coefficient update field |
| 5:4 | coefficient (+1) update | <u>5 4</u><br>1 1 = reserved<br>1 0 = increment<br>0 1 = decrement<br>0 0 = hold |
| 3:2 | coefficient (0) update | <u>3 2</u><br>1 1 = reserved<br>1 0 = increment<br>0 1 = decrement<br>0 0 = hold |
| 1:0 | Coefficient (-1) update | <u>1 0</u><br>1 1 = reserved<br>1 0 = increment<br>0 1 = decement<br>0 0 = hold |

*Fig. 7*

| Cell(s) | Name | Description |
|---|---|---|
| 19 | Parity | Set to achieve even parity for status report field |
| 18:14 | Reserved | Transmitted as zeros |
| 13:12 | Training Frame Countdown | Number of training frames remaining before link training process transitions to data mode |
| 11:7 | PMA Alignment Offset | Relative location of the next training frame within the PMA frame |
| 6 | Receiver ready | 1 = The local receiver has determined that training is complete and is prepared to receive data.<br>0 = The local receiver is requesting that training continue. |
| 5:4 | coefficient (+1) status | 5 4<br>1 1 = maximum<br>1 0 = minimum<br>0 1 = updated<br>0 0 = not_updated |
| 3:2 | coefficient (0) status | 3 2<br>1 1 = maximum<br>1 0 = minimum<br>0 1 = updated<br>0 0 = not_updated |
| 1:0 | Coefficient (-1) status | 1 0<br>1 1 = maximum<br>1 0 = minimum<br>0 1 = updated<br>0 0 = not_updated |

*Fig. 8*

| training frame word # | UI # | 45:36 | 35:26 | 25:16 | 15:6 | 5:0 | frame marker |
|---|---|---|---|---|---|---|---|
| 1 | | | | Marker | | | |
| | Bit pattern | 1111111111 | 1111111111 | 1110000000 | 0000000000 | 000000 | |
| 2 | DME | cell 15 | cell 14 | cell 13 | cell 12 | overhead | coef update |
| | Bit pattern | 1111111111 | 0000000000 | 1111111111 | 0000000000 | 11000 | |
| | Cell value | | 0 | 0 | 0 | 1 | |
| 3 | DME | cell 11 | cell 10 | cell 9 | cell 8 | overhead | coef update |
| | Bit pattern | 1111111111 | 0000000000 | 1111111111 | 0000000000 | 11000 | |
| | Cell value | | 0 | 0 | 0 | 1 | |
| 4 | DME | cell 7 | cell 6 | cell 5 | cell 4 | overhead | coef update |
| | Bit pattern | 1111111111 | 0000000000 | 1111111111 | 0000000000 | 11000 | |
| | Cell value | | 0 | 0 | 0 | 1 | |
| 5 | DME | cell 3 | cell 2 | cell 1 | cell 0 | overhead | coef update |
| | Bit pattern | 1111111111 | 0000000000 | 1111111111 | 0000000000 | 11000 | |
| | Cell value | | 0 | 0 | 0 | 1 | |

*Fig. 12a*

| training frame word # | UI # | 45:36 | 35:26 | 25:16 | 15:6 | 5:0 | |
|---|---|---|---|---|---|---|---|
| 1 | | Bit pattern | 11111111 | 11111111 | Marker 11100000000 | 000000000 | 000000 | frame marker |
| 2 | DME | Bit pattern | cell 15 11111111 | cell 14 00000000 | cell 13 11110000 | cell 12 11111111 | overhead 000111 | coef update |
| | | Cell value | | 0 | 0 | 1 | 0 | 1 |
| 3 | DME | Bit pattern | cell 11 00000000 | cell 10 11111111 | cell 9 00000000 | cell 8 11111111 | overhead 000111 | coef update |
| | | Cell value | | 0 | 0 | 0 | 0 | 1 |
| 4 | DME | Bit pattern | cell 7 00000000 | cell 6 11110000 | cell 5 11111111 | cell 4 00000000 | overhead 111000 | coef update |
| | | Cell value | | 0 | 0 | 1 | 0 | 1 |
| 5 | DME | Bit pattern | cell 3 11111111 | cell 2 00000000 | cell 1 11111111 | cell 0 00000000 | overhead 111000 | coef update |
| | | Cell value | | 0 | 0 | 0 | 0 | 1 |

*Fig. 12b*

| TFW | 45:36 | 35:26 | 25:16 | 15:6 | 5:0 | | |
|---|---|---|---|---|---|---|---|
| 1 | | | Marker | | | frame marker | |
| 2 | cell 15 | cell 14 | cell 13 | cell 12 | overhead | coef update | |
| 3 | cell 11 | cell 10 | cell 9 | cell 8 | overhead | coef update | |
| 4 | cell 7 | cell 6 | cell 5 | cell 4 | overhead | coef update | |
| 5 | cell 3 | cell 2 | cell 1 | cell 0 | overhead | coef update | |
| 6 | cell 19 | cell 18 | cell 17 | cell 16 | overhead | status report | |
| 7 | cell 15 | cell 14 | cell 13 | cell 12 | overhead | status report | |
| 8 | cell 11 | cell 10 | cell 9 | cell 8 | overhead | status report | |
| 9 | cell 7 | cell 6 | cell 5 | cell 4 | overhead | status report | |
| 10 | cell 3 | cell 2 | cell 1 | cell 0 | overhead | status report | |
| 11 | trng patn | trng patn | trng patn | trng patn | training pattern | training pattern | |
| ... | | | | | | | |
| 101 | trng patn | trng patn | trng patn | trng patn | training pattern | training pattern | |
| 102 | trng patn | trng patn | trng patn | trng patn | training pattern | training pattern | |
| ... | | | | | | | |
| 192 | trng patn | trng patn | trng patn | trng patn | training pattern | training pattern | |
| 193 | trng patn | trng patn | trng patn | trng patn | training pattern | training pattern | |
| ... | | | | | | | |
| 283 | trng patn | trng patn | trng patn | trng patn | training pattern | training pattern | |
| 284 | trng patn | trng patn | trng patn | trng patn | training pattern | training pattern | |
| ... | | | | | | | |
| 348 | trng patn | trng patn | trng patn | trng patn | training pattern | training pattern | |

| Lane | Output of | Contents of first 2 TFWs (from left to right) |
|---|---|---|
| L0 | PRBS | (illegible) |
| | Graycode | (illegible) |
| | Precoder | (illegible) |
| L1 | PRBS | (illegible) |
| | Graycode | (illegible) |
| | Precoder | (illegible) |
| L2 | PRBS | (illegible) |
| | Graycode | (illegible) |
| | Precoder | (illegible) |
| L3 | PRBS | (illegible) |
| | Graycode | (illegible) |
| | Precoder | (illegible) |

*Fig. 15b*

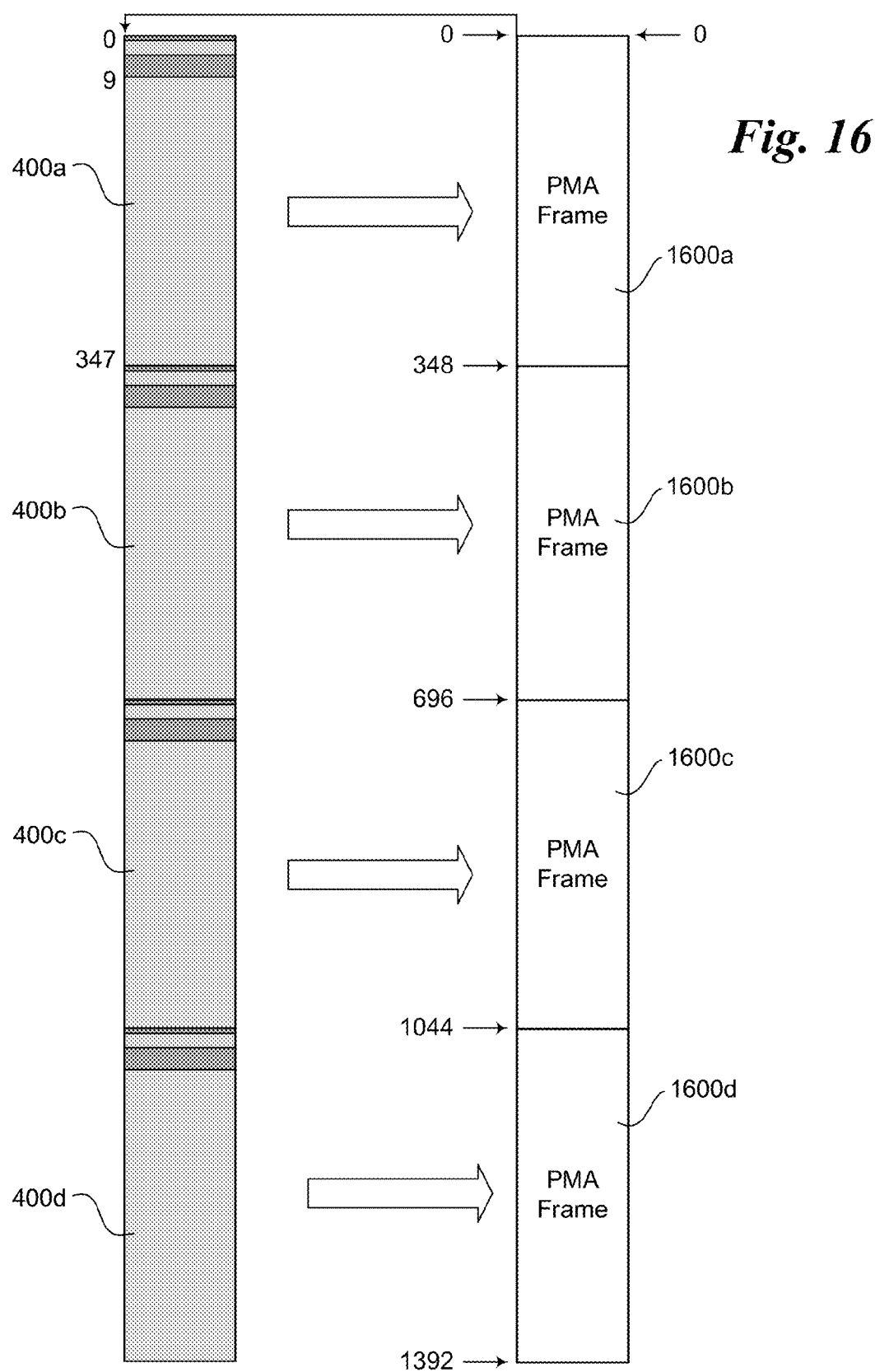

PMA-SIZE TRAINING FRAME FOR 100GBASE-KP4

CROSS-REFERENCE TO RELATED APPLICATION

This application claims the benefit of the filing date of U.S. Provisional Application No. 61/731,344, filed Nov. 29, 2012, entitled "PMA-SIZE TRAINING FRAME FOR 100 GBASE-KP4" under 35 U.S.C. §119(e). U.S. Provisional Application No. 61/731,344 is further incorporated herein in its entirety for all purposes.

FIELD OF THE INVENTION

The field of invention relates generally to Ethernet-based interconnects and, more specifically but not exclusively relates to techniques for implementing Physical Media Attachment (PMA) alignment and rapid transition from a link training mode to a data mode for high-speed Ethernet links.

BACKGROUND INFORMATION

Ever since the introduction of the microprocessor, computer systems have been getting faster and faster. In approximate accordance with Moore's law (based on Intel® Corporation co-founder Gordon Moore's 1965 publication predicting the number of transistors on integrated circuits to double every two years), the speed increase has shot upward at a fairly even rate for nearly three decades. At the same time, the size of both memory and non-volatile storage has also steadily increased, such that many of today's personal computers are more powerful than supercomputers from just 10-15 years ago. In addition, the speed of network communications has likewise seen astronomical increases.

Increases in processor speeds, memory, storage, and network bandwidth technologies have resulted in the build-out and deployment of networks with ever substantial capacities. More recently, the introduction of cloud-based services, such as those provided by Amazon (e.g., Amazon Elastic Compute Cloud (EC2) and Simple Storage Service (S3)) and Microsoft (e.g., Azure and Office 365) has resulted in additional network build-out for public network infrastructure, in addition to the deployment of massive data centers to support these services which employ private network infrastructure.

A typical data center deployment includes a large number of server racks, each housing multiple rack-mounted servers or blade servers. Communications between the rack-mounted servers is typically facilitated using the Ethernet (IEEE 802.3) protocol over copper wire cables. In addition to the option of using wire cables, blade servers and network switches and routers may be configured to support communication between blades or cards in a rack over an electrical backplane or mid-plane interconnect.

In recent years, the speed of Ethernet connections over copper wiring has reached the 10 Gigabits per second (Gpbs) and 40 Gpbs level. Moreover, The IEEE (Institute of Electrical and Electronics Engineers) is currently developing a specification (IEEE 802.3bj) defining a new backplane PHY type called 100 GBASE-KP4 that is targeted for a bandwidth of 100 Gbps over electrical backplanes with a loss up to 33 dB at 7 GHz. A similar specification for a new 100 Gbps over a cable connection is also being defined by the IEEE. An important aspect for facilitating successful implementation of 100 Gbps links is link training, which includes PMA alignment and transition from a link training mode to a data mode.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 7 is a table illustrating exemplary encodings for cells in Coefficient Update fields;

FIG. 8 is a table illustrating exemplary encodings for cells in Status Report fields;

FIG. 9b is a schematic diagram illustrating further details of selected LAN CSMA/CD layers in FIG. 9a;

FIGS. 12a and 12b are data structure diagrams illustrating the Frame Marker and Coefficient Update portions of a Training Frame, and further illustrating respective parity schemes, according to one embodiment;

FIG. 13 is a diagram of a data structure illustrating a training frame, accordingly to one embodiment;

FIG. 15b illustrates an exemplary set of four PRBS13 initiation states;

FIG. 16 illustrates a plurality of training frames transmitted using PMA logic used for transmitting PMA frames during data mode, and an alignment between the training frames and the PMA frames;

FIG. 18b is a rear isometric view of the blade server chassis of FIG. 16a;

DETAILED DESCRIPTION

Embodiments of methods, apparatus and systems for implementing PMA alignment and rapid transition from a link training mode to a data mode for a high-speed Ethernet link are described herein. In the following description, numerous specific details are set forth (such as implementation of a 100 Gbps Ethernet link) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments for facilitating link training with rapid transition from link training mode to data mode for high-speed Ethernet links including the proposed 100 GBASE-KP4 PHY are disclosed herein. In order to preserve compatibility with existing training mechanisms, some aspects of link training for the 100 GBASE-KP4 PHY are common to similar aspects defined for the IEEE 10 GBASE-KR PHY, which is targeted at 10 Gbps links and is currently employed in various types of equipment such as switches and routers. Additionally, there are other common aspects that are defined in IEEE Std 802.3ap-2007. While these common aspects may be identified and briefly discussed herein, corresponding detailed discussions of how these aspects may operate or be implemented are generally not provided herein in order to not obscure inventive aspects of the embodiments. Other aspects of some embodiments are described in further detail in IEEE P802.3bj Draft 1.2 and IEEE P802.3bh Draft 3.1.

Figures 1, 2:
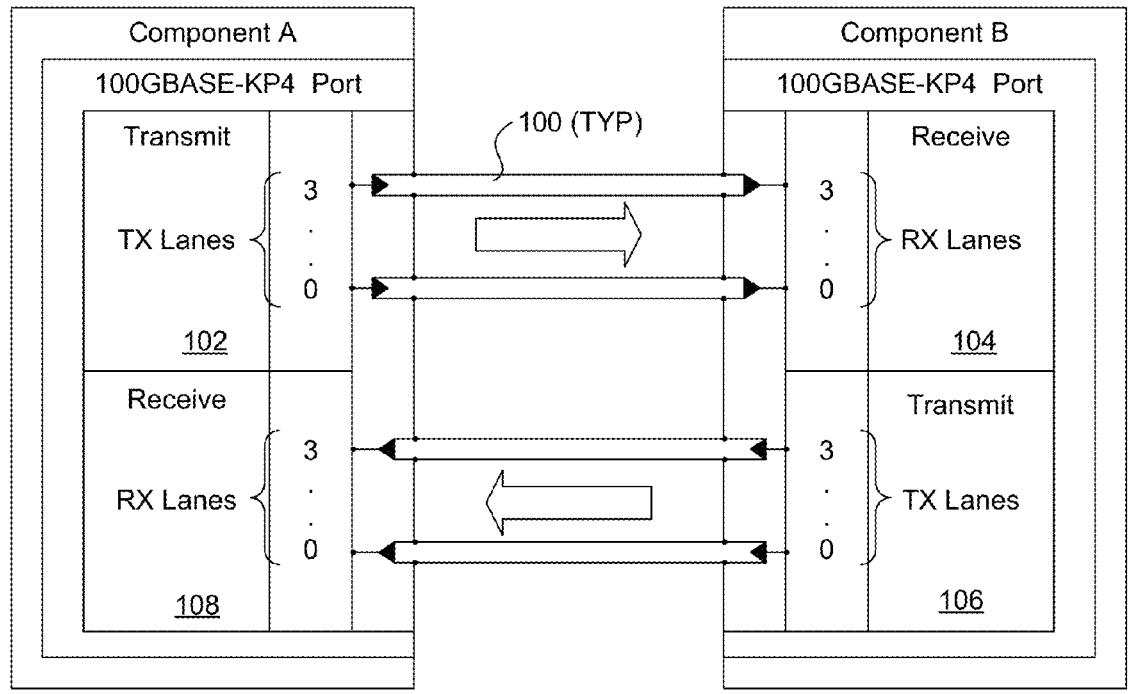
FIG. 1 is a schematic diagram illustrating the structure of a 100 GBASE-KP4 link, according to one embodiment.
FIG. 2 is a diagram illustrating mapping for PAM4 encoding.

The Physical layer (also referred to a "PHY") structure of one embodiment of a 100 GBASE-KP4 link is illustrated in FIG. 1. The PHY defines the physical structure of the interconnect and is responsible for dealing with details of operation of the signals on a particular link between two link partners, such as depicted by components A and B. This layer manages data transfer on the signal wires, including electrical levels, timing aspects, and logical issues involved in sending and receiving each bit of information across the parallel lanes. As shown in FIG. 1, the physical connectivity of each interconnect link is made up of four differential pairs of signals 100, comprising lanes 0-3 in each direction. Each port supports a link pair consisting of two uni-directional links to complete the connection between two components. This supports traffic in both directions simultaneously.

Components with 100 GBASE-KP4 ports communicate using a pair of uni-directional point-to-point links, defined as a link pair, as shown in FIG. 1. Each port comprises a Transmit (Tx) link interface and a Receive (Rx) link interface. For the illustrated example, Component A has a Tx port 102 that is connected to Component B Rx port 104. Meanwhile, Component B has a Tx port 104 that is connected to Component B Rx port 108. One uni-directional link transmits from Component A to Component B, and the other link transmits from Component B to Component A. The "transmit" link and "receive" link is defined relative to which component port is transmitting and which is receiving data. In the configuration illustrated in FIG. 1, the Component A transmit link transmits data from the Component A Tx port 102 to the Component B Rx port 104. This same Component A transmit link is the Port B receive link.

The 100 GBASE-KP4 PHY uses a 4-level pulse amplitude modulation (referred to as PAM4) signal to send and receive data across the channel. As shown in FIG. 2, PAM4 consists of four logical levels that are mapped as follows:

0 maps to −1
1 maps to −⅓
2 maps to +⅓
3 maps to +1

Logical levels 0 and 3 respectively correspond to low and high level signals having signal levels −1 and +1, while logical levels 1 and 2 correspond to intermediate level signals have signal levels −⅓ and +⅓.

The physical signaling for the 100 GBASE-KP4 PHY employs a Unit Interval (UI) of 1 bit having a time corresponding to 13.59375 Gbd symbols (~73.6 psec). In one embodiment a Training Frame Word (TFW) of 46 UI is employed for link training. Each TFW corresponds to one 92-bit terminated block (TB92).

Figure 3:
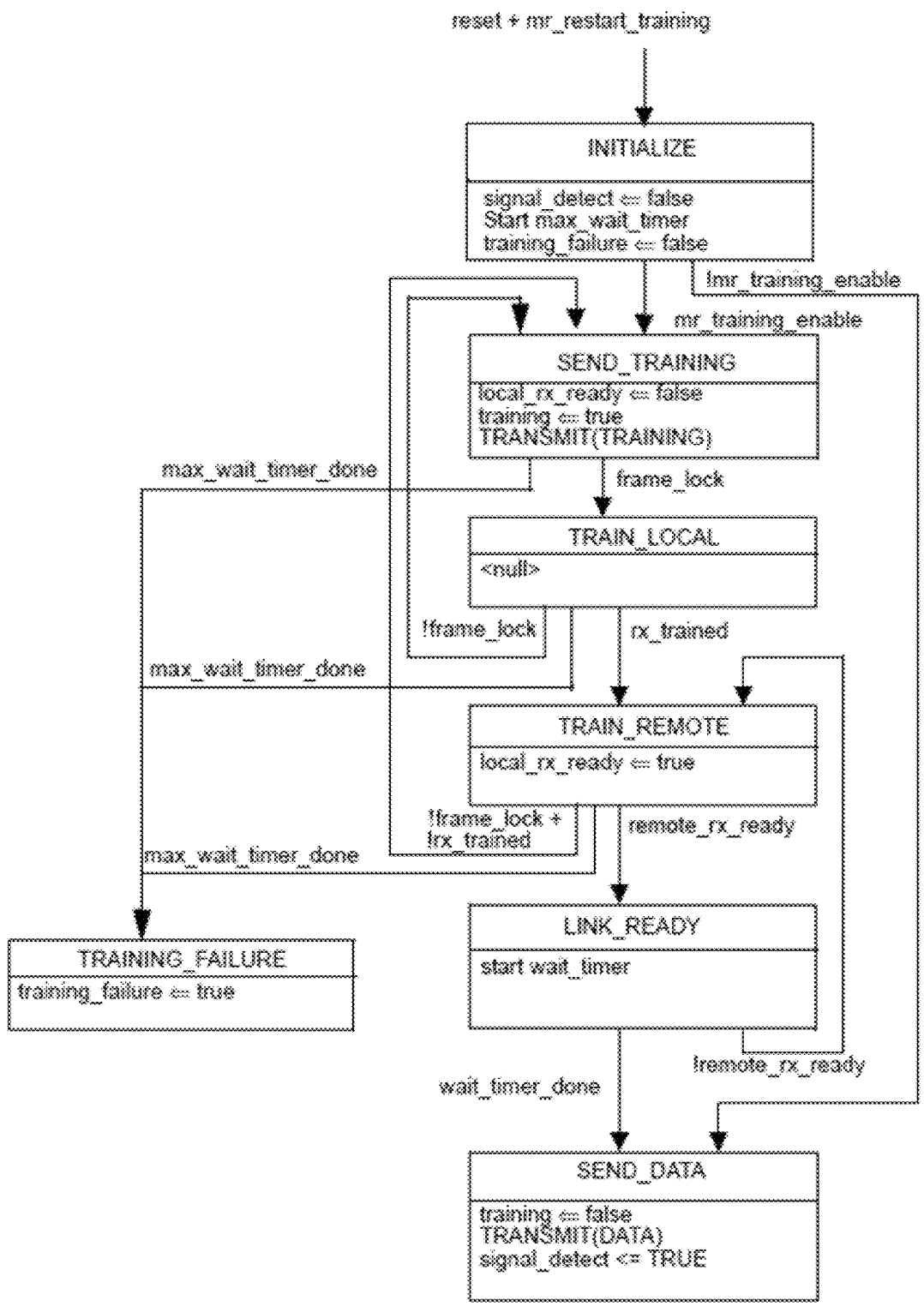
FIG. 3 is a training state diagram for a 10 GBASE-KR PHY.

In one embodiment, the format for the training sequence for the 100 GBASE-KP4 PHY is similar to that employed for the 10 GBASE-KR PHY defined in the IEEE Std. 802.3ap-2007 specification. The training state diagram for 10 GBASE-KR PHY is shown in FIG. 3. A significant difference between the 10 GBASE-KR PHY and the 100 GBASE-KP4 PHY is that the former defines a NRZ (Non-return to Zero) 2-level (PAM2) PHY rather than a 4-level PAM4 signal.

The 100 GBASE-KP4 link is established using the following sequence:

(1) Auto-negotiate capabilities to link partner (2) Send out training sequence to tune PHY for the channel's characteristics Obtain Frame Lock TX FFE handshake: Adapt Tx coefficients to channel characteristics DSP converged: Train Rx to channel Status Exchange Ready or not?

(3) Countdown to data mode and Send out idle symbols

Figure 4A:
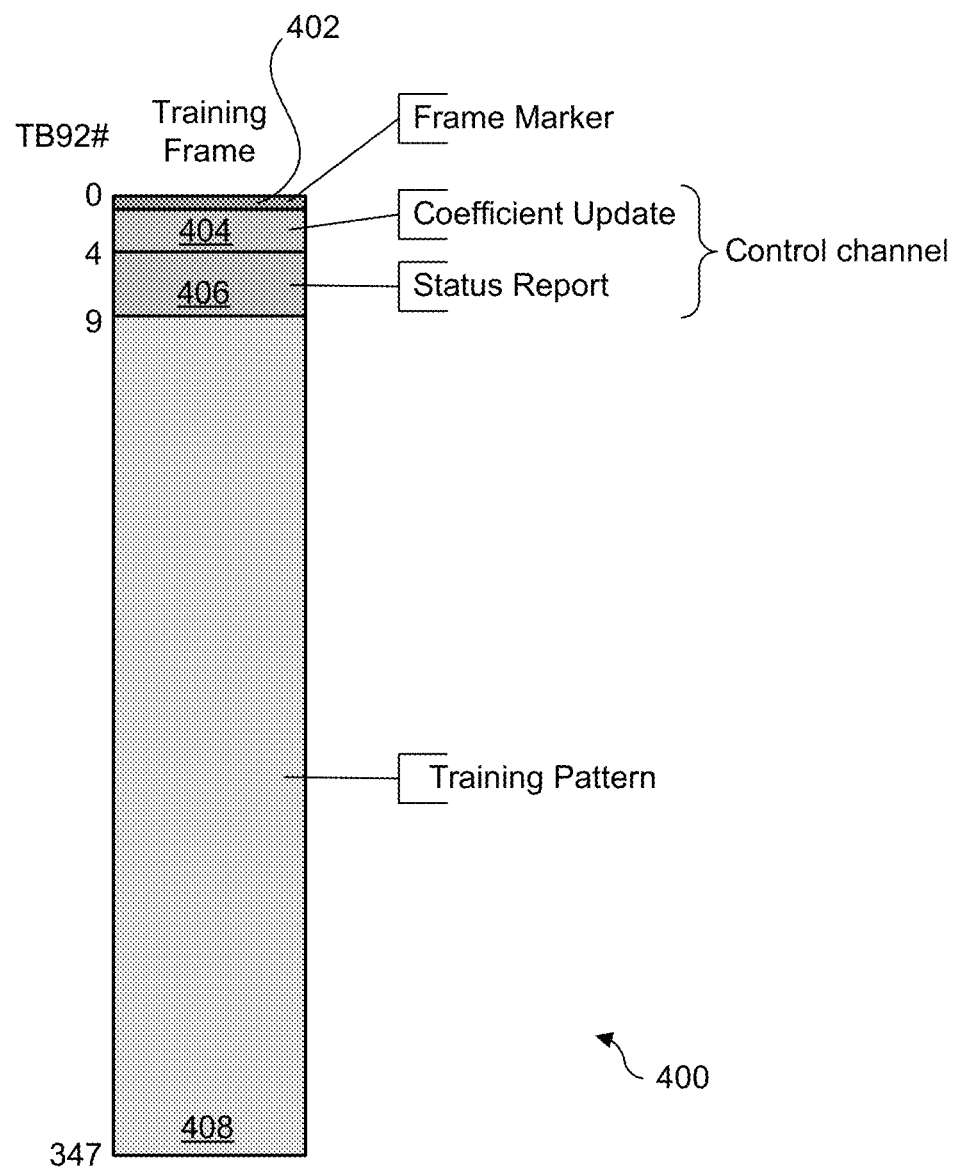
FIG. 4a is a block diagram showing the components of a training frame, according to one embodiment.
Figure 4B:
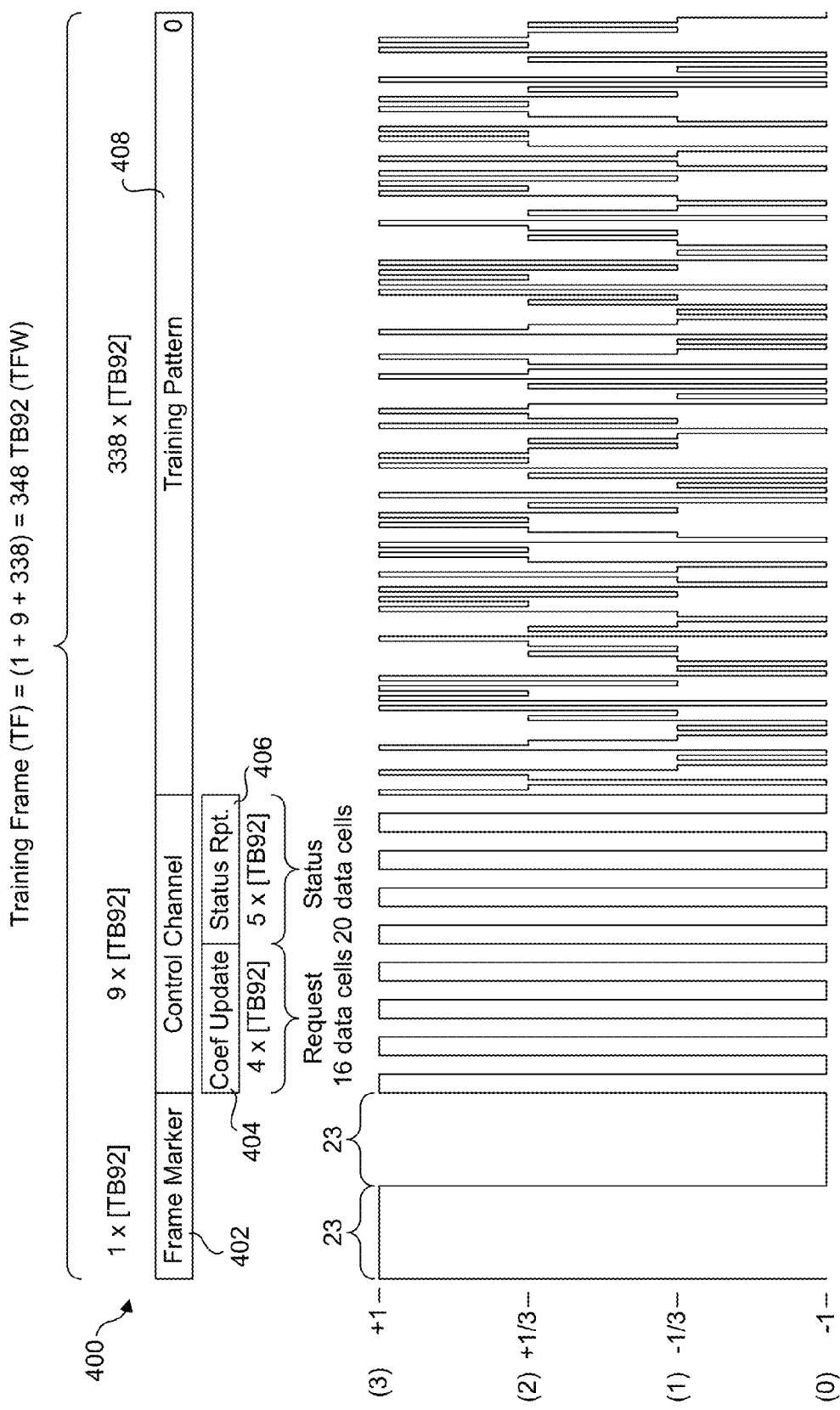
FIG. 4b is a schematic diagram illustrating a training frame and exemplary signaling, according to one embodiment.
Figure 4C:
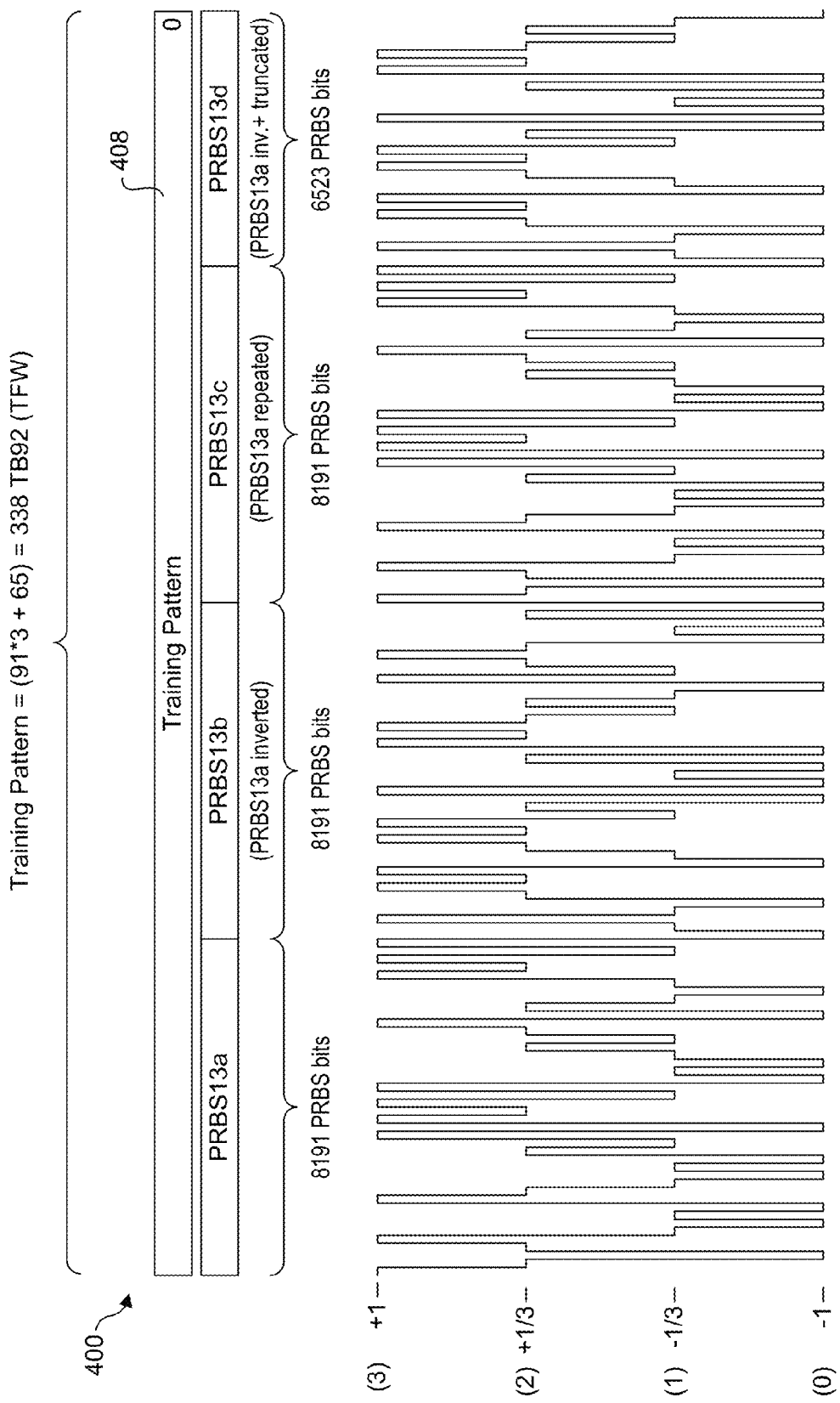
FIG. 4c is a schematic diagram illustrating further details of a training pattern used in the training frame of FIGS. 4b and 4c, according to one embodiment.

The training frame is a fixed length structure that is sent continuously during training. As shown in FIG. 4a, in one embodiment, a training frame 400 includes a Frame Marker 402 comprising 1 TB92, a Control Channel including a Coefficient Update 404 comprising 4 TB92 and a Status Report 406 comprising 5 TB92, and a Training Pattern 408 comprising 338 TB92 for a total of length of 338 TB92s or 348 TFWs. Further details of training frame 400 are shown in FIGS. 4b and 4c and discussed below.

In one embodiment, training Frames are delimited by the bit pattern, hexadecimal 3FFFFFF800000 (23 ones followed by 23 zeros in which the ones are +1 PAM4 symbols and the zeros are −1 PAM4 symbols), as expressed in 13.59375 Gbd symbols. This is illustrated by the Frame Markers shown in FIGS. 4b, 5a, 5b, 12a, 12b, and 13 and 14.

Figure 6:
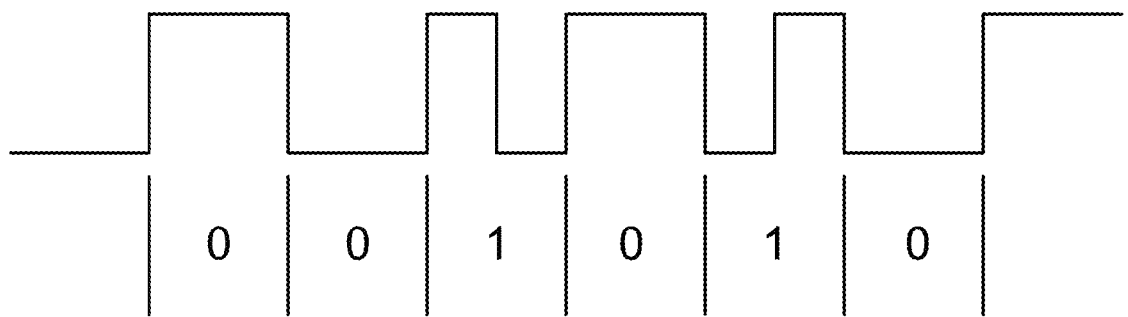
FIG. 6 is a diagram illustrating differential Manchester coding.

The control channel is transmitted using differential Manchester encoding DME. An example of DME is shown in FIG. 6. The rules of differential Manchester encoding are as follows:

a) A data transition shall occur at each cell boundary.

b) A mid-cell data transition shall be used to signal a logical one.

c) The absence of a mid-cell data transition shall be used to signal a logical zero.

If a coding violation is detected within the bounds of the control channel in a given training frame, the contents of the control channel for that frame are ignored.

Figure 5A:
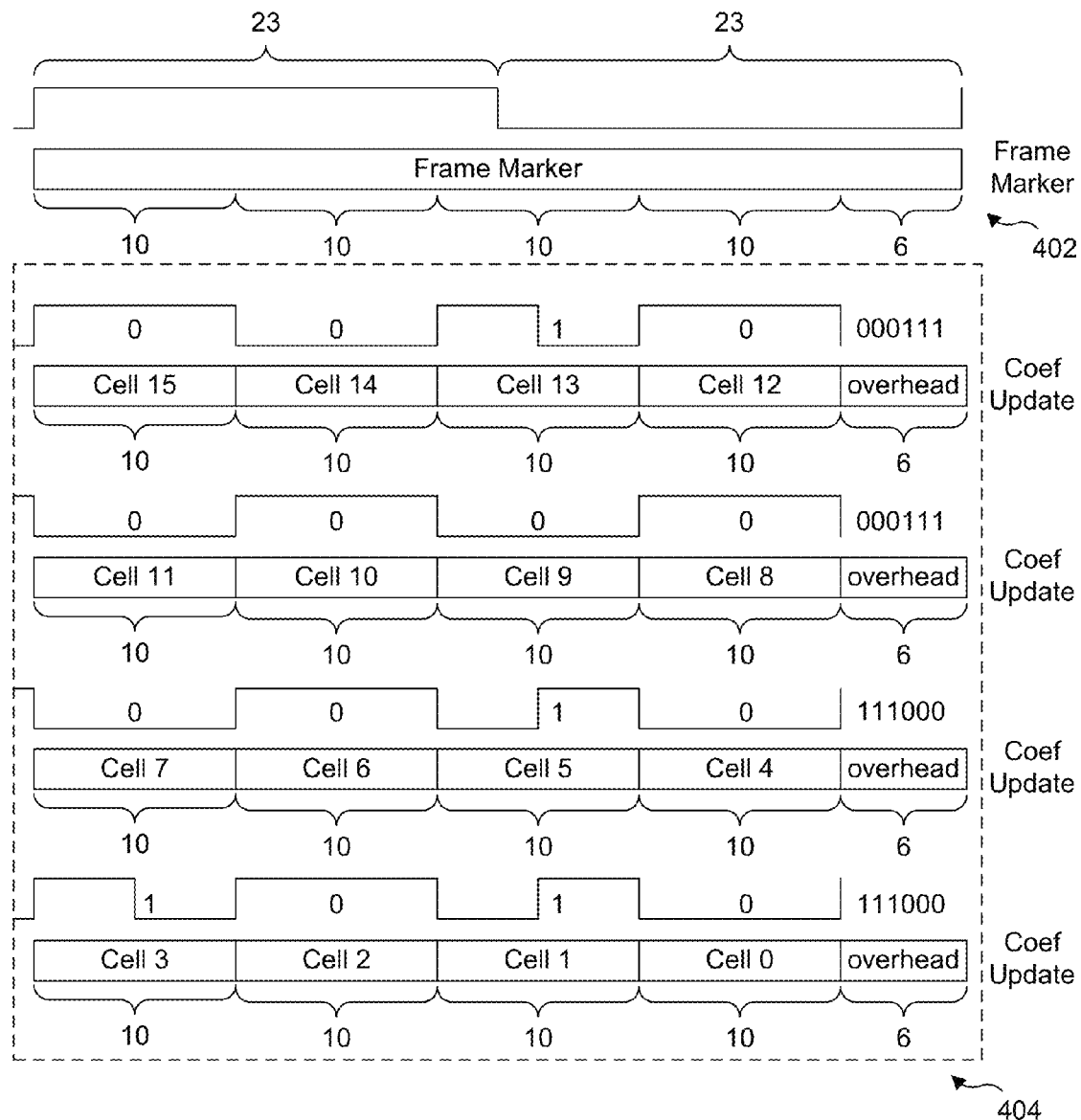
FIG. 5a shows an exemplary structure for a Frame Marker and Coefficient Update portion of a training frame, according to one embodiment.
Figure 5B:
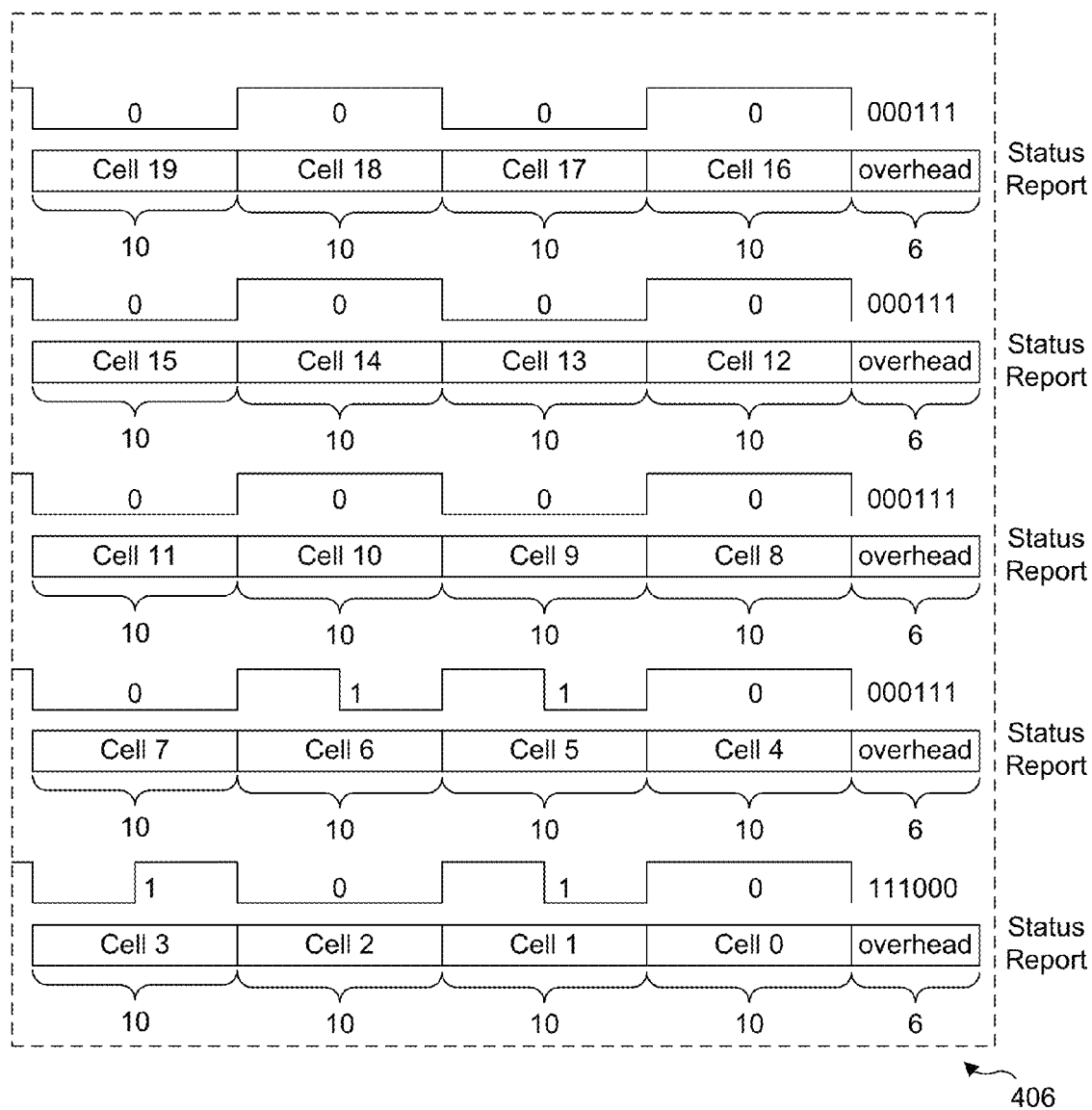
FIG. 5b shows an exemplary structure for a Status Report portion of a training frame, according to one embodiment.

As shown in FIGS. 4b, 5a and 5b, in one embodiment Coefficient Update 404 comprises a 16 data cell request, while Status Report 406 comprises a 20 data cell Status. The length for the cells in each of Coefficient Update 404 and Status Report 406 is 10 UI, and each of the 4 TFWs are configured as four cells followed by a 6 UI overhead field, resulting in a control channel length of 9×46=414 UI. In one embodiment at least a portion of the cells in Coefficient Update 404 are mapped to corresponding coefficient update fields defined for the 10 GBASE-KR PHY shown in FIG. 7, while at least a portion of the cells in Status Report 406 are mapped to corresponding status report fields in defined for the 10 GBASE-KR PHY shown in FIG. 8.

Figure 9A:
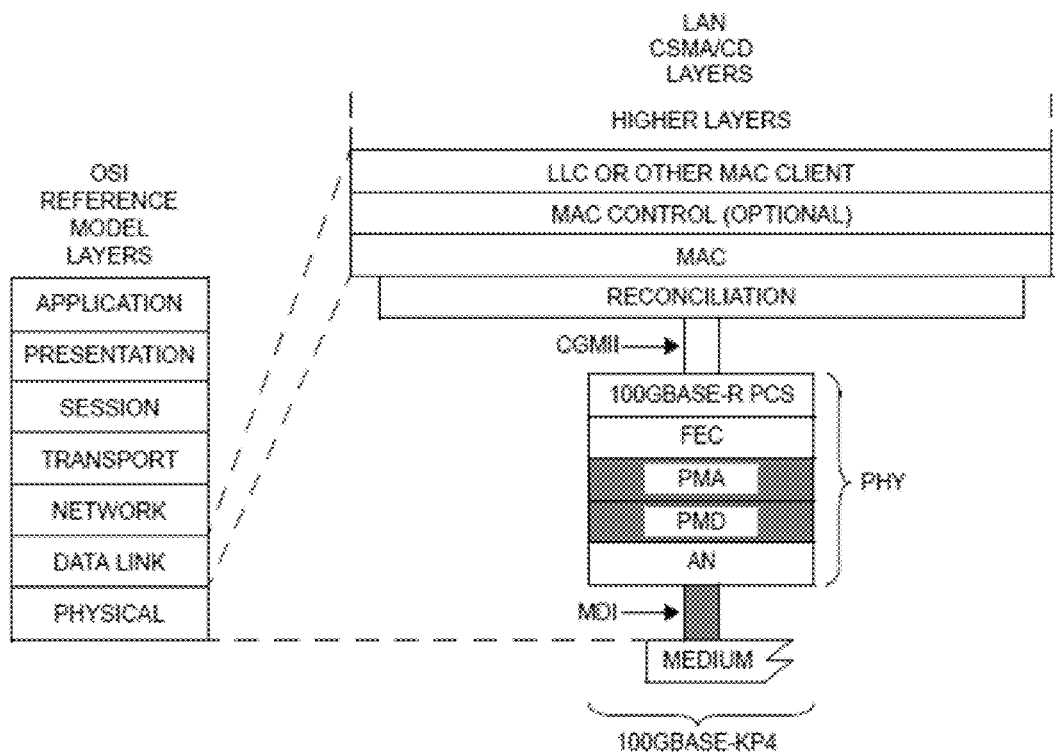
FIG. 9a is a schematic diagram illustrating the relationship between the Data Link and Physical layers of the OSI reference model and IEEE 802.3 LAN CSMA/CD LAN model layers corresponding to the current draft of 100 GBASE-KP4 defined in IEEE P802.3bj Draft 1.0.
Figure 9B:
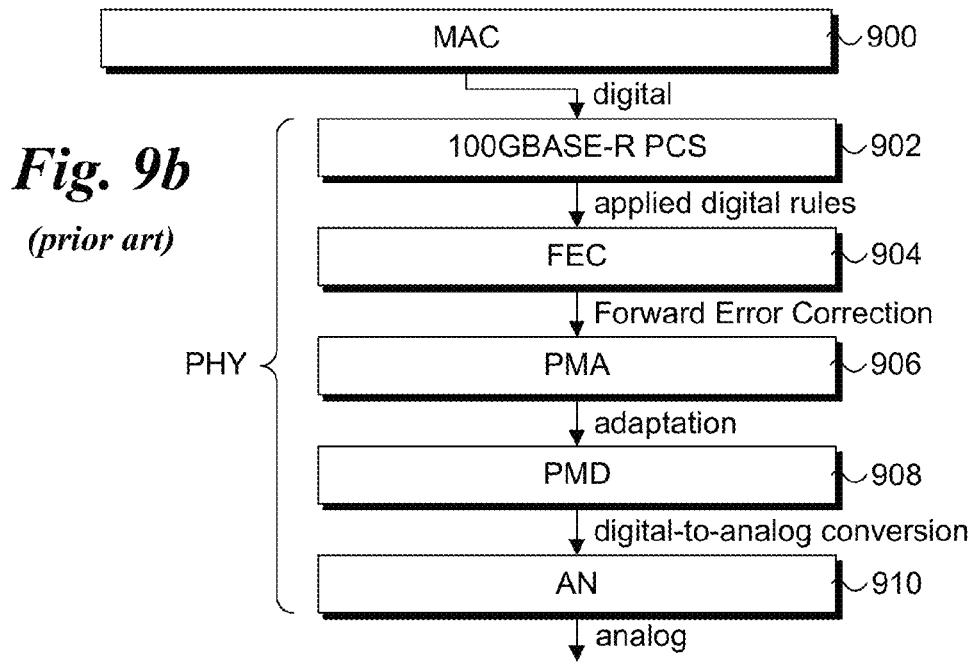

FIG. 9a shows details of the relationship between the Data Link and Physical layers of the OSI reference model and IEEE 802.3 LAN CSMA/CD LAN model layers corresponding to the current draft of 100 GBASE-KP4 defined in IEEE P802.3bj Draft 1.2. FIG. 9b shows further details of selected LAN CSMA/CD layers, including a MAC (Media Access Control) layer 900, a 100 GBASE-R Physical Coding Sublayer (PCS) sublayer 902, a Forward Error Correction (FEC) sublayer 904, a Physical Media Attachment (PMA) sublayer 906, a Physical Media Dependent (PMD) sublayer 908, and an Auto-Negotiation (AN) sublayer 910. Data is received in digital format as a binary bit stream by MAC layer 900, which processes and forwards the binary data to 100 GBASE-R PCS sublayer 902, which applies digital rules to the binary data to transform the data as described below. The transformed digital data are then passed to FEC sublayer 904, which performs Forward Error Correction. FEC uses the coding gain to increase the link budget and BER performance on a given channel. The link budget consists of the electrical parameters which define the connection between the transmit circuitry and the receive circuitry, such as insertion loss, return loss, pulse response, etc.

In the transmit direction, the role of PMA sublayer 906 is to adapt the signal output by FEC sublayer 904 to a PAM4 encoded signal to be passed to PMD sublayer 908 and AN sublayer 910 for transfer over the attached medium. One embodiment of the adaptation processes shown in FIG. 10 includes an insert overhead block 1002, an insert termination bits block 1004, a Gray coding block 1006, a [1/(1+D)mod 4] precoding block 1008, and a PAM4 encoding block 1010.

Figure 10:
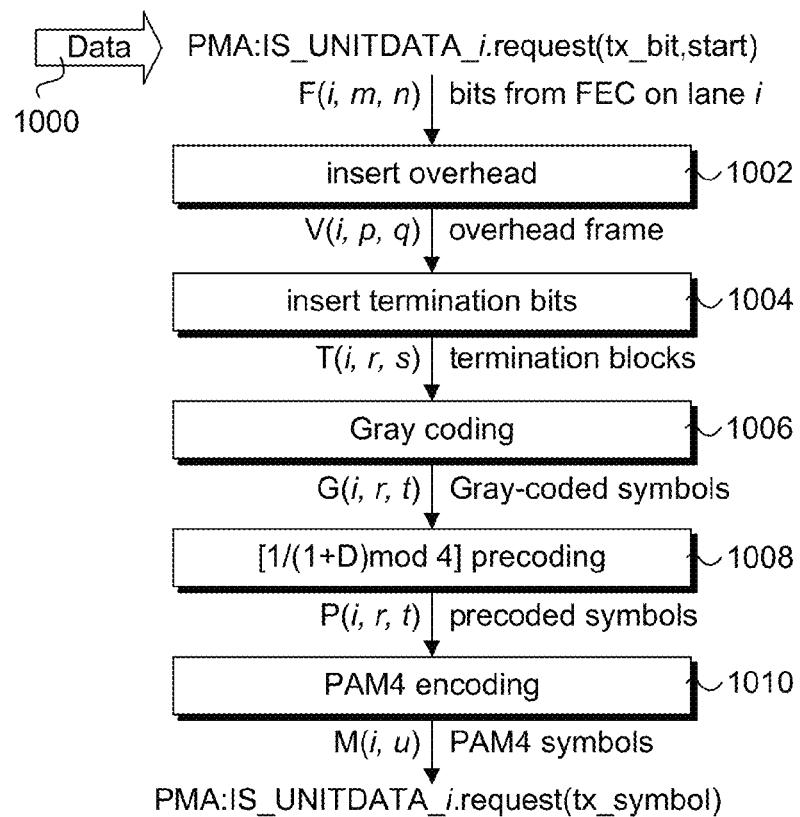
FIG. 10 is a transmit adaption process diagram illustrating operations performed by the PMA sublayer during link up transmit operations.

In further detail, incoming data 1000 in FIG. 10 is received by PMA sublayer 906 from FEC sublayer 904 comprising a PMA:IS_UNITDATA_i.request (where i=0 to 3) primitive used to define the transfer of four streams of a data from the PMA client to PMA. The data conveyed by PMA:IS_UNITDATA_0.request to PMA:IS_UNITDATA_3.request consists of four parallel streams of encoded bits, one stream for each of lanes 0-3. Each tx_bit parameter is either a '1' or '0'. The start parameter is TRUE to indicate that the concurrent tx_bit is the first bit of the first, second, third, or fourth FEC symbol in the FEC codeword, or is otherwise FALSE. On each transaction, tx-bit is assigned F(i, m, n), where i is the lane number, m is an index indicating the FEC codeword number and increments at the start of each codeword, and n is an index indicating the bit number within the codeword.

Insert overhead block 1002 creates a sequence of overhead frames by inserting 40 overhead bits for every 31280 FEC bits. The FEC bits, F(i, m, n) are mapped into a continuous sequence of overhead frames. The overhead frame is 31320 bits in length. Each bit in the overhead frame is denoted V(i, p, q), where: i is the lane number; p is an index that indicates the frame number and increments at the start of each frame; and q is an index that indicates the bit number within a frame with a range 1 to 31320. The first 40 bits of the frame, V(i, p, 1) to V(i, p, 40) are the overhead bits. The next 31280 bits, V(i, p, 41) to Vi, p, 31320) are composed of the bits from 23 consecutive FEC codewords.

The overhead bits are inserted in the frame as follows:

V(i, p, 1)=H(i, p, 1)

V(i, p, 2)=H(i, p, 2)

V(i, p, . . . )=H(i, p, . . . )

V(i, p, 40)=H(i, p, 40)

The FEC codeword bits are aligned such that V(i, p, 41) is the first bit of a codeword, e.g., V(i, p, 41)=F(i, m, 1). The FEC bits are inserted into the frame in the order in which they were received from the FEC, e.g., V(i, p, 42)=F(i, m, 2), V(i, p, 43)=F(i, m, 3), and so on.

Insert termination bits block 1004 creates a sequence of termination blocks by inserting a two termination bits for every 90 overhead frame bits. The termination block is the 92 bits in length, the same as a TFW. Each bit in a termination block is denoted T(i, r, s), where: i is the lane number; r is an index indicating block number and increments at the start of each block; and s is an index indicating the bit number within a termination block with a range 1 to 92. The first two bits of each termination block, T(i, r, 1) and T(i, r, 2) are populated with the output of a PRBS13 Generator R(i,v), where T(i, r, 1)=R(i,v) and T(i, r, 2)=R(i,v+1). The remaining 90 bits of each termination block, T(i, r, 3) to T(i, r, 92), are overhead frame bits, as discussed above. The frame bits are aligned relative to the termination blocks such that the first bit of an overhead bit, V(i, p, 1), corresponds to the third bit of a termination block, T(i, r, 3). Overhead frame bits are mapped to the termination blocks in order of location within the overhead frame, e.g., T(i, r, 4)=V(i, p, 2), T(i, r, 5)=V(i, p, 3), and so on. The termination bit PRBS13 generator is initialized during the training process. When training is complete the state of the termination bit PRBS13 generator is retained and the resulting output is used for the termination bits in the PMA frame.

The PMA sublayer next maps consecutive pairs of bits to one of four Gray-coded via Gray coding block 1006. Each pair of bits, {A, B}, of each termination block are converted to a Gray-coded symbol with one of the four Gray-coded levels as follows:

{0, 0} maps to 0,
{0, 1} maps to 1,
{1, 1} maps to 2, and
{1, 0} maps to 3.

Gray-coded symbols corresponding to each termination block are denoted G(i, r, t), where: i is the lane number; r is an index indicating the termination block number; and t is an index indicating the symbol number within a termination block with a range 1 to 46. Pairing of bits is such that the first two bits of each termination block, T(i, r, 1) and T(i, r, 2), form a pair. Each bit pair {T(i, r, 2t−1), T(i, r, 2t)} maps to {A, B} and the Gray-coded result is assigned to G(i, r, t). The gray-coded symbol G(i, r, 1) is formed from the first two bits of a termination block, the termination bits, thus forming a termination symbol.

Precoding of the Gray-coded symbols is next performed by [1/(1+D)mod 4] precoding block 1008. The precoder output symbols are denoted, P(i, r, t), where: i is the lane number; r is an index indicating the termination block number; and t is an index indicating the symbol number within a termination block with a range 1 to 46. For each Gray-coded symbol G(i, r, t), a precoded symbol, P(i, r, t) is determined by the following algorithm:

```
If t = 1 then
    P(i, r, t) = G(i, r, t)
Else
    P(i, r, t) = (G(i, r, t) − P(i, r, t−1)) mod 4
End If
```

The bits contributing to the Gray-coded termination symbol, G(i, r, 1), are the termination bits. The precoding algorithm applies this symbol directly to the output rather than combining it with the previous non-deterministic symbols and thus this termination symbol is always deterministic.

The last operation performed by PMA sublayer 906 is PAM4 encoding performed by PAM4 encoding block 1010. The PAM4 encoded symbols are denoted M(i, u), where i is the lane number and u is an index indicating the symbol number. Each consecutive precoder output symbol, P(i, r, t), is mapped to one of four PAM4 levels and assigned to the PAM4 encoder output M(i, u). Mapping from the precoder output symbol P(i, r, t) to a PAM4 encoded symbol M(i, u) is shown in FIG. 2 and discussed above.

Figure 11:
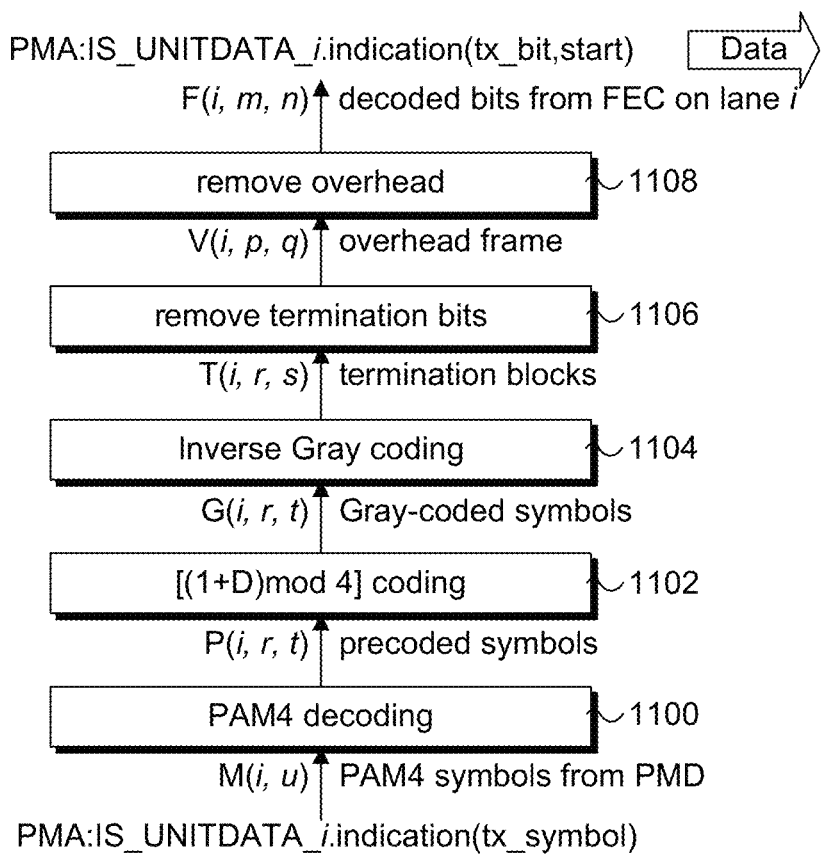
FIG. 11 is a receive adaption process diagram illustrating operations performed by the PMA sub-layer during link up receive operations.

In the received direction, the role of the 100 GBASE-KP4 PMA is to adapt the PAM4 encoded signal from the PMD to a FEC encoded signal to be passed to the FEC for further processing. One embodiment of the adaptation processes are shown in FIG. 11 and include a PAM4 decoding block 1100, a [(1+D)mod 4] coding block 1102, an inverse Gray coding block 1104, a remove termination bits block 1106, and a remove overhead block 1108. In general terms, each of these blocks performs an inverse operation to a corresponding block in FIG. 10 described above. Accordingly, further details are not provided herein.

Figure 10A:
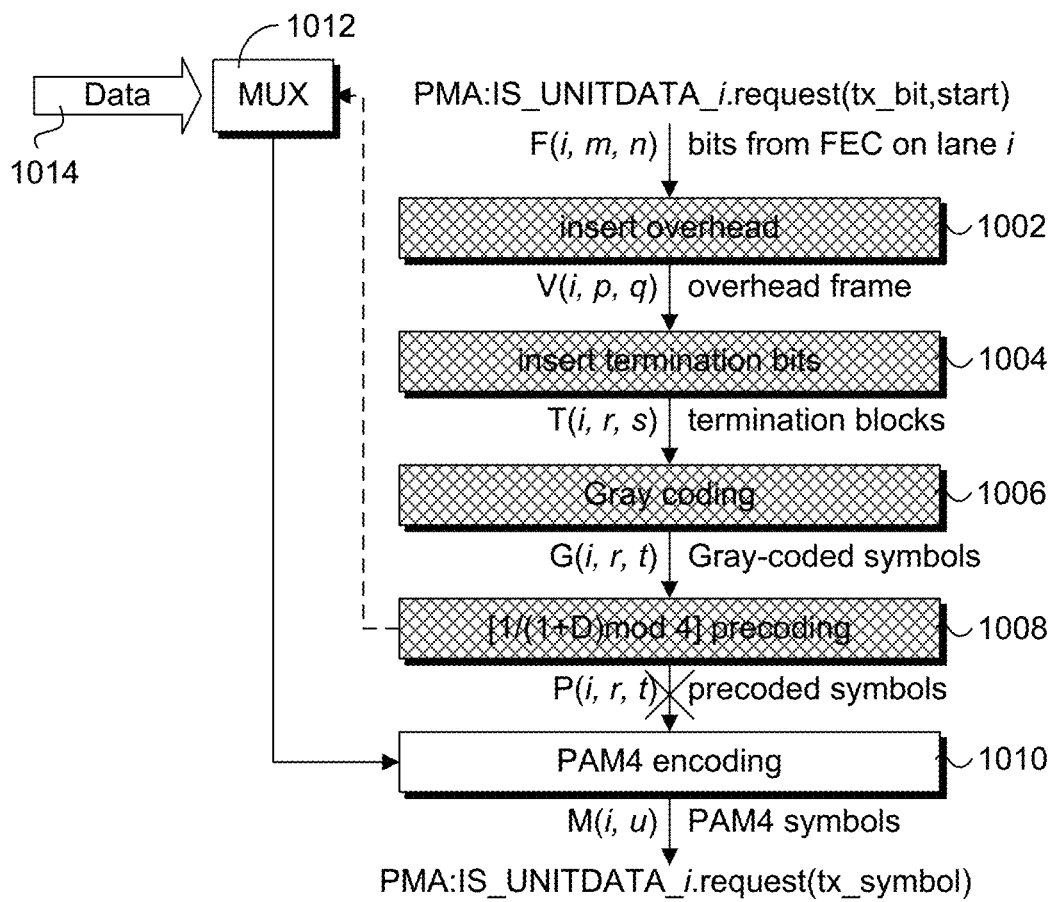
FIG. 10a is a transmit adaption process diagram illustrating operations performed by the PMA sublayer during transmission of the Frame Marker and Control Channel portions of a training frame; according to one embodiment.

To simplify the link establishment process discussed above when TRANSMIT(TRAINING) as shown in FIG. 3, the PAM4 multi-level signaling is not used for the Frame Marker, Coefficient Update, and Status Report data. During the transmission of Frame Marker 402, Coefficient Update 404, and Status Report 406, the PAM4 transmitter bypasses the overhead frame, termination block, gray coding, and 1/(1+D)mod 4 precoding stages of the PMA transmit and receive functional specifications. This is illustrated in FIG. 10a, wherein data 1014 is redirected by a multiplexer (MUX) 1012 to PAM4 encoding block 1010, by passing each of insert overhead block 1002, insert termination bits block 1004, Gray coding block 1006, and [1/(1+D)mod 4] precoding block 1008. Therefore, the output levels are restricted to the −1 PAM4 symbol level for a logic 0 and the +1 PAM4 symbol level for a logic 1 to enable easy receiver lock to the training pattern over poor quality and non-equalized channels.

Figure 11A:
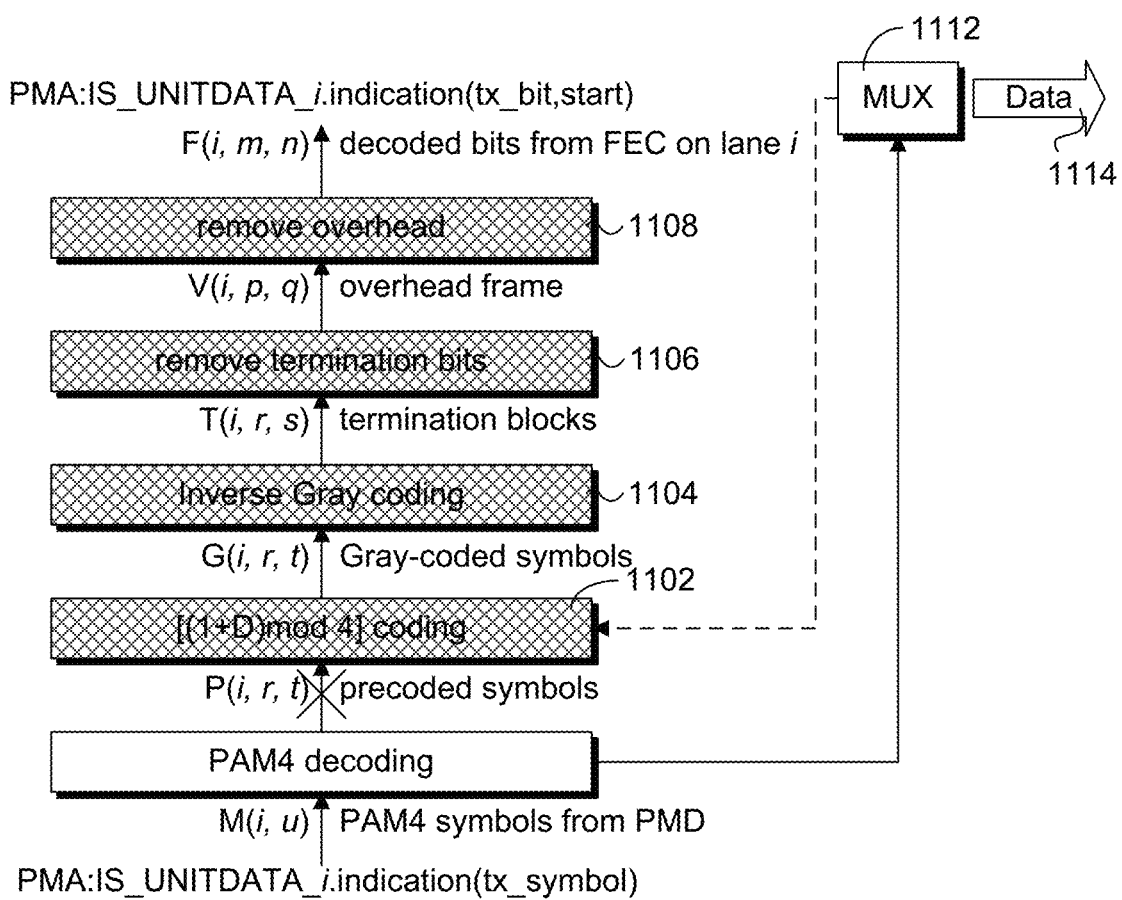
FIG. 11a is a receive adaption process diagram illustrating operations performed by the PMA sublayer during receiving of the Frame Marker and Control Channel portions of a training frame; according to one embodiment.

The corresponding receiver operations for processing received data during transmission of Frame Marker 402, Coefficient Update 404, and Status Report 406 are shown in FIG. 11a. As illustrated, a MUX 1112 is configured to output data 1114 from PAM4 decoding block 1000, bypassing the operations of [(1+D)mod 4] coding block 1102, inverse Gray coding block 1104, remove termination bits block 1106, and remove overhead block 1108.

As discussed above, each TFW for the Coefficient Update 404 and Status Report 406 includes a 6 UI overhead field comprising 6 overhead bits. In one embodiment, the overhead bits are set to provide a DME logic value of '1', e.g., coded as 000111 or 111000. This may be used to preserve DC balance for the TFW.

In one embodiment, a parity scheme is implemented through use of Coefficient Update and Status Report fields. Under one implementation, cell 6 of the coefficient update field table of FIG. 7 and cell 19 of the status report field table of FIG. 8 are used to transmit parity bits, as opposed to transmitting all 0's defined for this cell by the 10 GBASE-KR PHY specification. Two parity bits are calculated for each field (Coefficient Update and Status Report) separately, such that each field as a whole, including the parity bits, has even parity. The parity is the number of logical-one cells in the field, modulo 2 (not including the overhead bits). Under this parity scheme a parity check may be implemented to maintain DC balance of the control channel region and increase protection against false acceptance of sensitive messages, e.g., preset, init, and receiver ready. In one embodiment, if a parity violation is detected within the bounds of the respective field in a given training frame, the contents of that field within the control channel for that frame shall be ignored. For example, should only the parity of the coef update field be incorrect, then only the contents of the coef field will be ignored.

FIGS. 12a and 12b show respective examples of parity schemes, according to one embodiment. In FIG. 12a, a bit pattern of 0000000000 is used for the parity bits in cell 6. In FIG. 12b, a bit pattern of 1111100000 is used for the parity bits in cell 6.

Figure 10B:
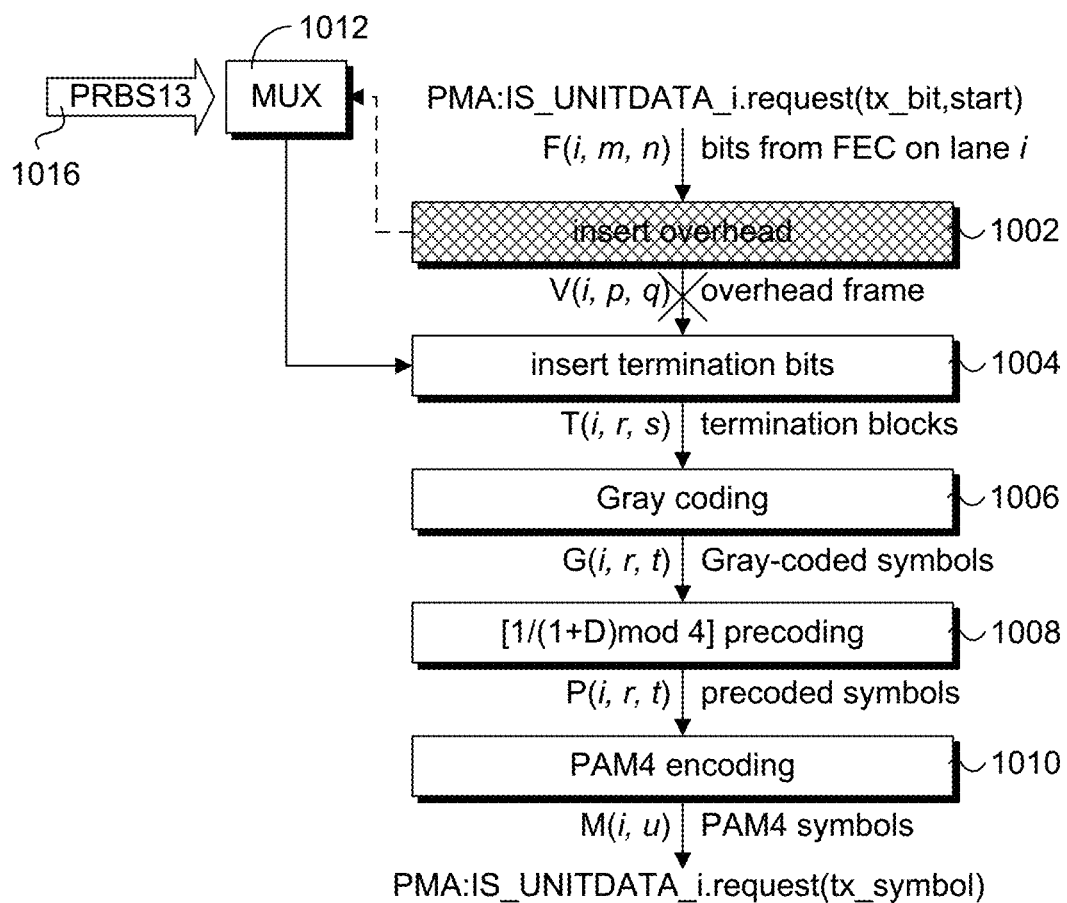
FIG. 10b is a transmit adaption process diagram illustrating operations performed by the PMA sublayer during transmission of the Training Pattern portion of a training frame; according to one embodiment.
Figure 11B:
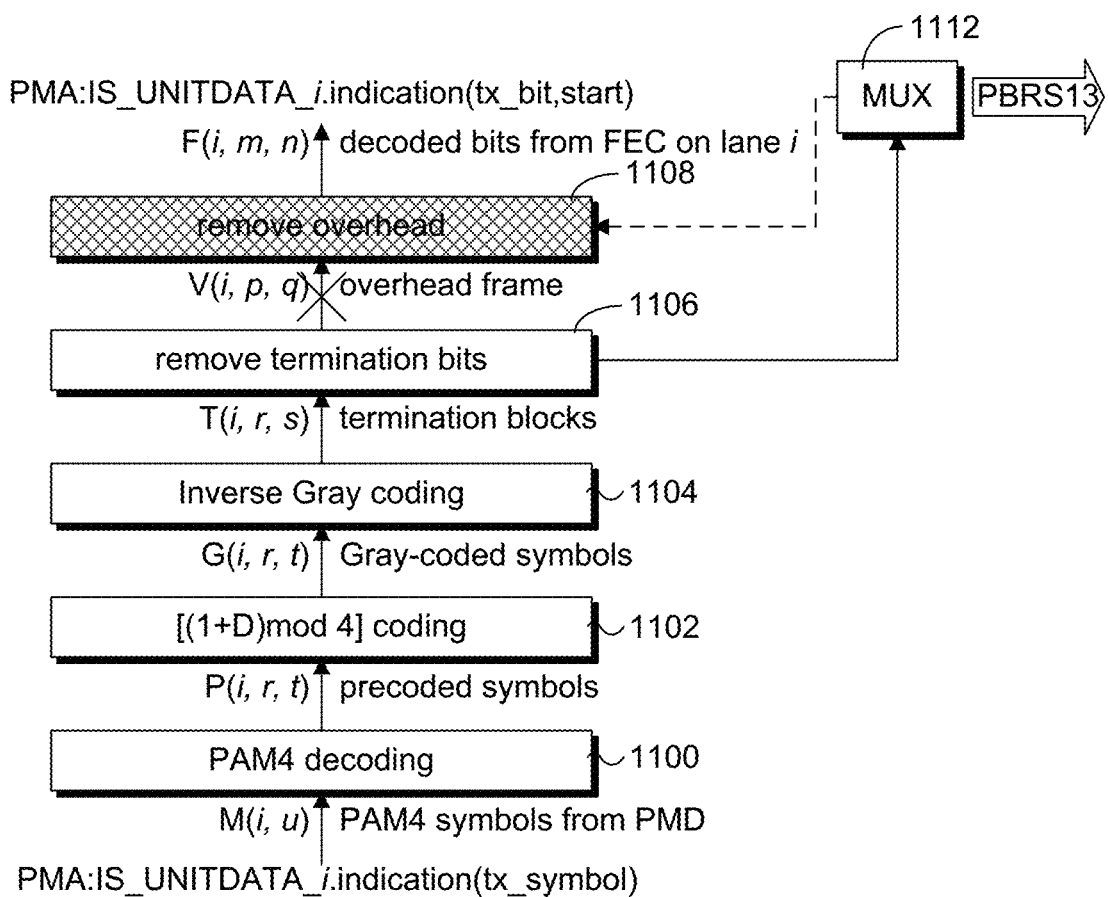
FIG. 11b is a receive adaption process diagram illustrating operations performed by the PMA sublayer during receiving of the Training Pattern portion of a training frame; according to one embodiment.

In one embodiment, Training Pattern 408 uses the PMA transmit and receive functional specifications as currently defined in IEEE P802.3bj Draft 1.0 to enable the transmitter and receiver to exercise termination block, gray coding, and 1/(1+D)mod 4 precoding stages, while the overhead framer is bypassed. Corresponding block diagrams to facilitate the transmitter and receiver operations are shown in FIGS. 10b and 11b, respectively. Training Pattern 408 employs all four levels of PAM4 signaling to facilitate receiver calibration.

In one embodiment, input data 1016 to the termination block logic (i.e., insert termination bits block 1004 in FIG.

10b) comprises a 13-bit Psuedo Random Bit Sequence known as PRBS13. PRBS13 is a 8191 bit sequence derived from a Fibonacci LFSR with polynomial function, $$G(x)=1+x+x^2+x^{12}+x^{13}$$

In one embodiment, each TFW termination block in the training pattern comprises 92 bits of PRBS13, with the first two bits comprising termination bits. In one embodiment training pattern 408 comprises three full sequences (i.e., 8191 bits) of PRBS13 data plus a truncated PRBS 13 sequence of 6523 bits for a total of 31096 bits that are transmitted during the 338 TB92 blocks (338 TFWs) corresponding to Training Pattern 408, as shown in FIGS. 4b, 4c and 13. In one embodiment, the second PRBS13 sequence comprises a bit inversion of the first, as depicted by PRBS13a and PRBS13b in FIG. 4c, while the first and third PRBS13 sequences PRBS13a and PRBS13c are the same. In addition the truncated PRBS13 sequence is also an inverted portion of the first 6523 bits of PRBS13a.

Figure 14:
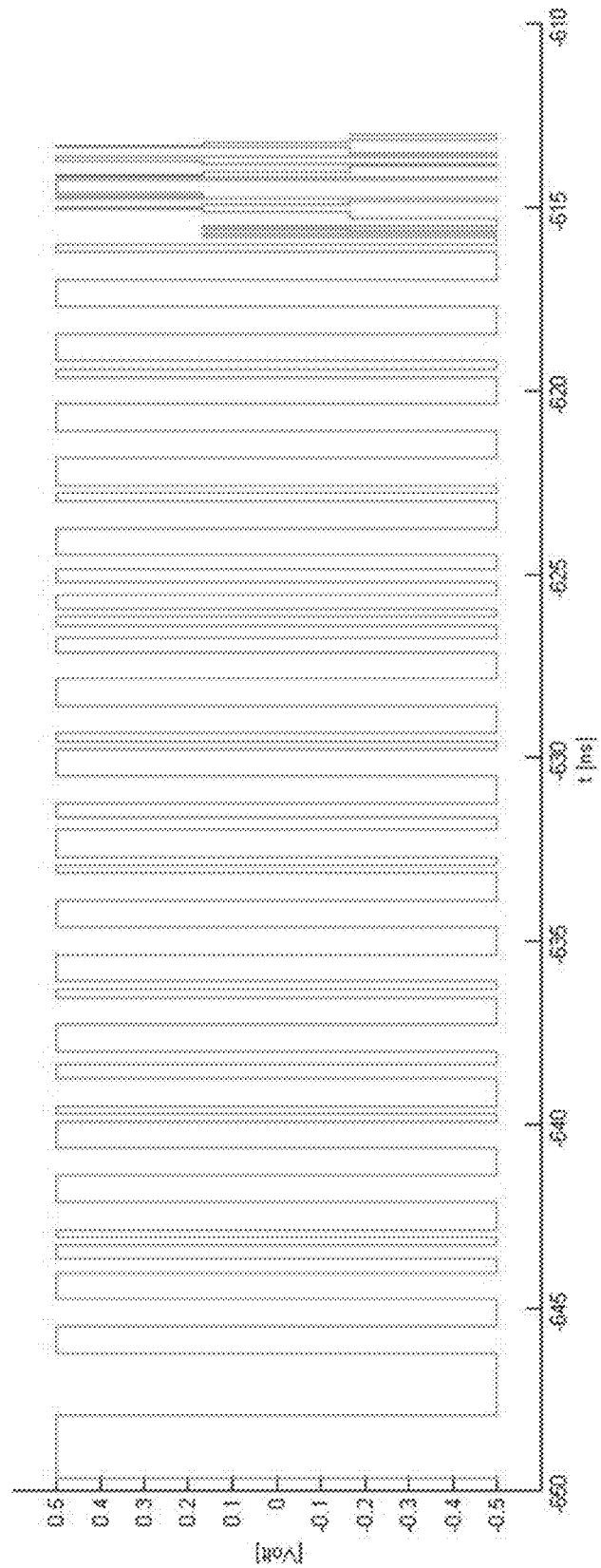
FIG. 14 is a graph illustrating signaling corresponding to a simulation of an exemplary training frame.

In addition to the example training pattern shown in FIGS. 4b, and 4c, FIG. 14 shows an example training pattern generated during a simulated link training operation. Note the full swing signaling on the left portion of the diagram during the Frame Marker and control channel portion of the frame. Also note the 4-level signaling on right during the training pattern portion of the frame.

Figure 15A:
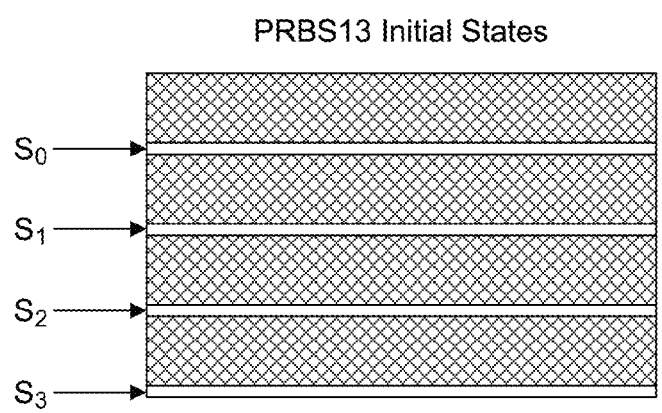
FIG. 15a illustrates selection of four PRBS13 initiation states that are approximately ¼ cycle apart.

In one embodiment, the training pattern initial states for lanes 0-3 are defined in the following manner. Preferably, the initial four states are chosen such that the four resulting PAM4 sequences have low autocorrelation (except at offset 0) and low cross-correlation between each pair, as illustrated in FIGS. 15a and 15b. An exemplary set of initial states meeting the foregoing conditions include (initial bits sent on the data path, LSB first): PMD lane 0: 0xCD92, PMD lane 1: 0x2AFB, PMD lane 2: 0xC3D3, PMD lane 3: 0xE2F6. This choice has a benefit that for each of the four lanes, the final output of the precoder is 0, which creates a distinguishable transition before the marker of the next frame. In one embodiment the generator is re-seeded to the same values at the beginning of each training frame. This will uniquely identify the lanes if they are swapped, and save lane order identification later on. This also has the benefit that the termination bit sequence is known to the receiver upon switching to data mode (i.e., run-time link operation mode after link initialization).

An example of PRBS, gray code, and precoder data sequences employing the foregoing initial states are shown in FIG. 15b. For each physical lane i=0 . . . 3, the training sequence shall start from state Si. The PRBS state and precoder state shall not advance during frame marker and control channel transmission.

Rapid Transition from Link Training Mode to Data Mode Using PMA-Size Training Frame During training mode, data is transmitted from a transmitter in a component at the first end of a link to a receiver in a component at the opposing (second) end of the link. Concurrently, data is transmitted from a transmitter in the component at the second end of the link to a receiver in the component at the first end of the link. This is schematically illustrated in FIG. 1, and discussed above. The objective of the training mode is to perform synchronization and tuning between the ports at each end of the link to enable accurate data transfer during data mode. During the training mode, sufficient synchronization and tuning will be obtained to enable transition to data mode, that is, the normal operational mode for the link during which data is transferred between the components at the opposing ends of the link.

Under one embodiment, a PMA frame having a length of 348 TB92 words is used for data modes, while a training frame have a matching size of 348 TB92 is used during training. Under this approach, much of the logic for processing the training frames at the receiver ports is the same for both the training frames during training mode and PMA frames during data mode. During training mode and transition to data mode, training frames are transmitted sequentially, as shown in FIG. 16 by training frames 400a, 400b, 400c and 400d While in link training mode, the training frames are not sent within PMA frames; however, the PMA framing logic and data paths are used to make the training frames. In one embodiment, training frames are transmitted such that they are aligned relative to the 40-bit overhead employed at the beginning of each PMA frame, as shown in FIG. 16 by PMA frames 1600a, 1600b, 1600c, and 1600d. As a result, when transition from training mode to data mode occurs, the last training frame is aligned with the first PMA frame used for the data mode.

In one embodiment, the training frame and PMA alignment aspect is used in combination with a countdown value to facilitate the transition from training mode to data mode. The use of the countdown value provides an indication to the receiving side that the transition will occur in j, j−1 . . . 1, 0 training frames, wherein a corresponding training_frame_countdown variable is employed to indicate the number of training frames remaining to be sent prior to data mode operation.

Returning to FIG. 8, the status field cells include two cells that are used for facilitating a rapid transition from training mode to data mode, which operate as follows. Upon detecting that sufficient synchronization and tuning has been establish on a link from a transmitter of a first component to a receiver of a second component, the transmitter of the second component returns a value of 1 in cell 6 of the status field to the receiver of the first component to indicate the local receiver has determined the training is complete and is prepared to receive data. A 2-bit training_frame_countdown value in cells 13:12 is also returned, facilitating a countdown sequence of 2, 1, 0, as described below in further detail.

Figure 17:
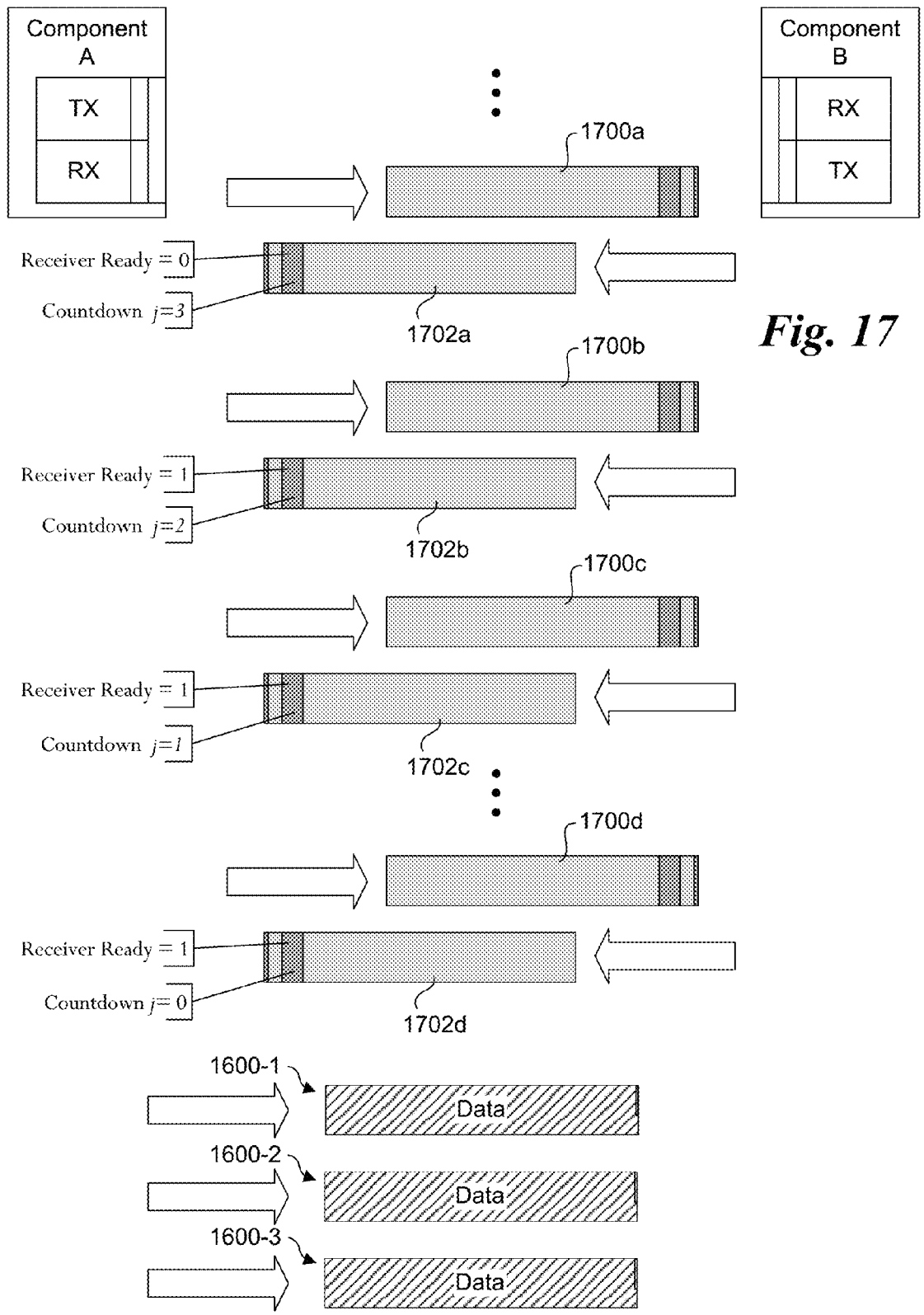
FIG. 17 illustrates a message flow diagram depicting an exchange of training frames between components at opposing ends of a link, wherein training frame status report field data are illustrated that are employed for facilitating a rapid transition between a link training mode and a data mode.

FIG. 17 shows an exchange of training frames and corresponding status field values employed to facilitate a transition from training mode to data mode for a link between components A and B employing countdown values j. During training mode operation, component A transmits training frames 1700 from its transmitter (TX) port to component B, which receives the training frames at its receiver (RX) port. In response to each training frame 1800 that is received, component B transmits back a training frame 1702 including parameters in status cells corresponding to a Receiver Ready value, and a Countdown value. Prior to establishing sufficient synchronization and tuning, component B will return training frames having a Receiver Ready value of '0', indicating that the local receiver (i.e., component B's RX port) is requesting training to continue. This is depicted by training frames 1700a and 1702a. During this timeframe prior to the local receiver indicating it is ready to transition to data mode, the countdown j value may be ignored; in various embodiments the countdown j value may be included in the Status Report field data or simply set at a predetermined value. In one embodiment, countdown j value=3 when Receiver Ready='0'.

In response to receiving a training frame 1700b, component B's local receiver indicates training is complete and it is ready to receive data, i.e., transition to data mode, by returning a training frame 1702b with a Receiver Ready value of '1'.

Also returned in training frame 1702*b* is a countdown value set to j, the initial countdown value. In one embodiment the value of j is set to '2'.

In one embodiment, in order to transition to data mode components at both ends of the link must be asserting Receiver Ready=1 (asserting Receiver_Ready). Once Receiver_Ready is asserted by both components, a Wait_Timer period is initiated during which approximately 100-300 training frames will be sent before transitioning to data mode. Toward the end of the Wait_Timer period, the countdown sequence will begin, thus identifying exactly when the transition to data mode will occur. Once the training_frame_countdown value reaches 0, the next portion of data that is received (following the current training frame) will comprise data mode data, while maintaining alignment with the PMA frame logic during the transition.

Continuing at training frames 1700*c* and 1702*c*, the returned status field values include Receiver Ready=1, along with a countdown value j=1, indicating the countdown value has been decremented by one. The countdown sequence continues until the countdown value j=0, as depicted by training frames 1700*d* and 1702*d*. At this point, the local transmitter (Component A's TX port) has been informed that the other component's receiver is configured to transition to data mode.

Continuing on at the lower portion of FIG. 17, once transition to data mode is completed, the next frame to be transmitted is a data frame that begins relative to a PMA frame 1600-1 such that it is aligned with the start of the 40-bit overhead field used by a PMA frame. The PMA frames transmitted from component A's TX port going forward (depicted by PMA frames 1600-2 and 1600-3) will comprise data frames having a format in accordance with the applicable format used for transferring data during data mode operations.

Exemplary Implementation Environment and Blade Server Architecture

It is envisioned that aspects of the embodiments herein may be implemented in various types of computing and networking equipment, such as switches, routers and blade servers such as those employed in a data center and/or server farm environment. Typically, the servers used in data centers and server farms comprise arrayed server configurations such as rack-based servers or blade servers. These servers are interconnected in communication via various network provisions, such as partitioning sets of servers into LANs with appropriate switching and routing facilities between the LANs to form a private Intranet. For example, cloud hosting facilities may typically employ large data centers with a multitude of servers.

As an overview, typical blade server components and systems are shown in FIGS. 18*a-c*, and 19. Under a typical configuration, a rack-mounted chassis 1800 is employed to provide power and communication functions for a plurality of server blades (i.e., blades) 1802, each of which occupies a corresponding slot. (It is noted that all slots in a chassis do not need to be occupied.) In turn, one or more chassis 1800 may be installed in a blade server rack 1803 shown in FIG. 18*c*. Each blade is coupled to an interface plane 1804 (i.e., a backplane or mid-plane) upon installation via one or more mating connectors. Typically, the interface plane will include a plurality of respective mating connectors that provide power and communication signals to the blades. Under current practices, many interface planes provide "hot-swapping" functionality—that is, blades can be added or removed ("hot-swapped") on the fly, without taking the entire chassis down through appropriate power and data signal buffering.

Figure 18A:
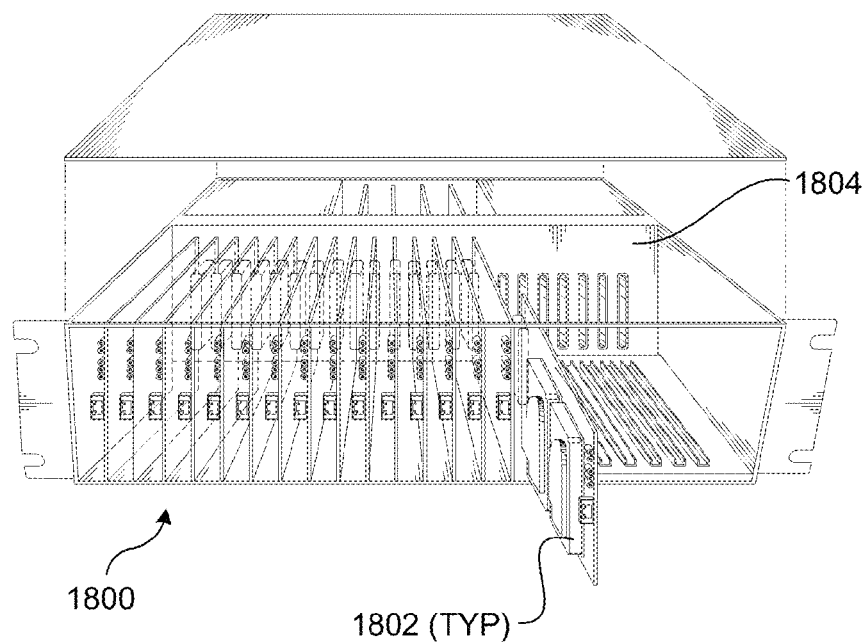
FIG. 18a is a frontal isometric view of an exemplary blade server chassis in which a plurality of server blades are installed.
Figure 18B:
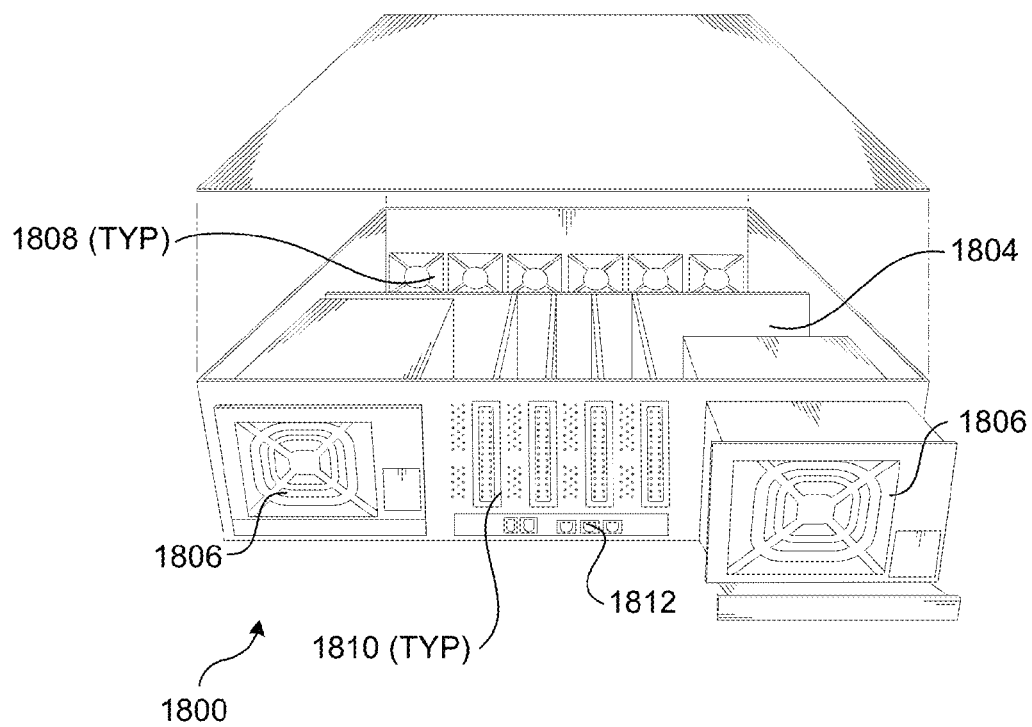
Figure 18C:
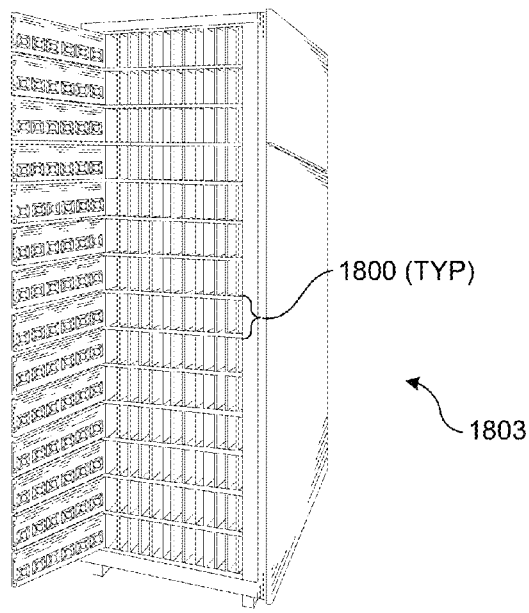
FIG. 18c is an isometric frontal view of an exemplary blade server rack in which a plurality of rack-mounted blade server chassis corresponding to FIGS. 18a and 18b are installed.

A typical mid-plane interface plane configuration is shown in FIGS. 18*a* and 18*b*. The backside of interface plane 1804 is coupled to one or more power supplies 1806. Oftentimes, the power supplies are redundant and hot-swappable, being coupled to appropriate power planes and conditioning circuitry to enable continued operation in the event of a power supply failure. In an optional configuration, an array of power supplies may be used to supply power to an entire rack of blades, wherein there is not a one-to-one power supply-to-chassis correspondence. A plurality of cooling fans 1808 are employed to draw air through the chassis to cool the server blades.

An important feature required of all blade servers is the ability to communicate externally with other IT infrastructure. This is typically facilitated via one or more network connect cards 1810, each of which is coupled to interface plane 1804. Generally, a network connect card may include a physical interface comprising a plurality of network port connections (e.g., RJ-45 ports), or may comprise a high-density connector designed to directly connect to a network device, such as a network switch, hub, or router.

Blade servers usually provide some type of management interface for managing operations of the individual blades. This may generally be facilitated by a built-in network or communication channel or channels. For example, one or more buses for facilitating a "private" or "management" network and appropriate switching may be built into the interface plane, or a private network may be implemented through closely-coupled network cabling and a network. Optionally, the switching and other management functionality may be provided by a management switch card 1812 that is coupled to the backside or frontside of the interface plane. As yet another option, a management or configuration server may be employed to manage blade activities, wherein communications are handled via standard computer networking infrastructure, for example, Ethernet.

Figure 19:
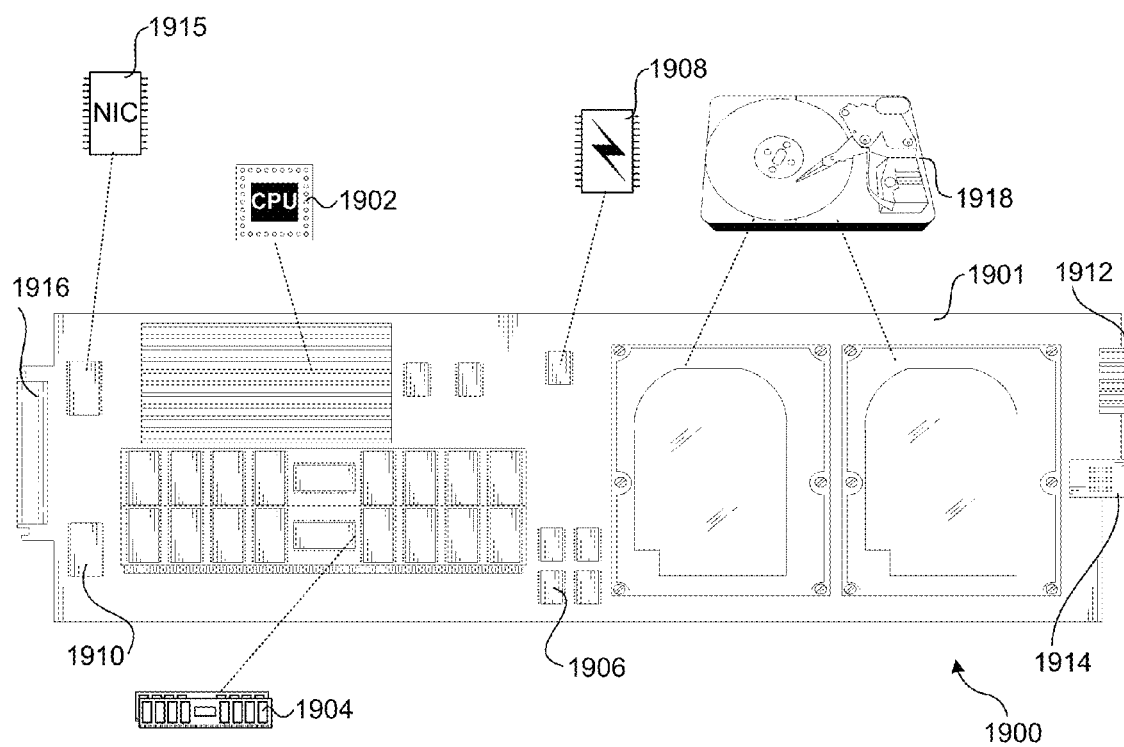
FIG. 19 shows details of the components of a typical server blade, according to one embodiment.

With reference to FIG. 19, further details of an exemplary blade 1900 are shown. As discussed above, each blade comprises a separate computing platform that is configured to perform server-type functions, i.e., is a "server on a card." Accordingly, each blade includes components common to conventional servers, including a main printed circuit board (main board) 1901 providing internal wiring (i.e., buses) for coupling appropriate integrated circuits (ICs) and other components mounted to the board. These components include one or more processors 1902 coupled to system memory 1904 (e.g., some form of Random Access Memory (RAM)), cache memory 1906 (e.g., SDRAM), and a firmware storage device 1908 (e.g., flash memory). A NIC (network interface controller) chip 1910 is provided for supporting conventional network communication functions, such as to support communication between a blade and external network infrastructure. Other illustrated components include status LED (light-emitting diodes) 1912, a set of RJ-45 console ports 1914 (only one of which is shown for simplicity), and a NIC 1915 coupled to an interface plane connector 1916. Additional components include various passive components (i.e., resistors, capacitors), power conditioning components, and peripheral device connectors.

Generally, each blade 1900 may also provide on-board storage. This is typically facilitated via one or more built-in disk controllers and corresponding connectors to which one or more disk drives 1918 are coupled. For example, typical disk controllers include SATA controllers, SCSI controllers, and the like. As an option, the disk drives may be housed separate from the blades in the same or a separate rack, such as might be the case when a network-attached storage (NAS) appliance or backend storage sub-system that is employed for storing large volumes of data.

NIC 1910 comprises circuitry and logic for facilitating corresponding networking operations, such as support for physical layer (L1) and data link layer operations (L2). Typically, upper layer operations are facilitated by an operating system network stack that would be hosted by an operating system running on processor 1902. However, in some embodiments, a NIC may employ its own network stack via embedded logic or the like.

In a typical data center deployment, network switching elements comprise rack-mounted equipment, such as would occupy a 1 U, 2 U, or 4 U slot, or may be implemented via one or more server blades. Optionally, a network switching element may be implemented use one or more server blades.

NIC 1915 comprises circuitry and logic for implementing high-speed communication between multiple blades 1900 via interface plane 1804. In one embodiment, NIC 1915 is configured to implement signaling and logic corresponding to the 100 Gbps embodiments disclosed herein, including circuitry and logic for implementing a 100 GBASE-KP4 port and associated link training operations. To further facilitate inter-blade communication over the 100 GBASE-KP4 PHY, interface plane 1604 includes appropriate connectors, circuitry and wiring for facilitating the physical media aspect of the PHY (wiring not shown). For example, the circuitry may comprise connectors and wiring for facilitating signaling over 8 differential pairs in accordance with the configuration shown in FIG. 1.

In general, aspects of the link training embodiments disclosed herein may be implemented hardware (via, e.g., embedded logic), or via a combination of hardware and software. For example, a network element may include a processor running a software-based network stack and associated logic implemented via software for performing aspects of the operations described herein. Optionally, similar logic could be implemented via embedded logic in a NIC, large-scale network interface, or the like.

In addition to implementation in a blade server, the principles and teachings herein may be implemented via other types of equipment, such as telecommunications routers and switches. For example, a typical telecom switch comprises a rack with multiple cards coupled to a backplane, wherein the cards are generally analogous to the blades and the backplane is analogous to the interface plane in a blade server. Accordingly, the cards would be configured with circuitry and logic for implemented 100 GBASE-KP4 ports, and the backplane would include connectors, circuitry, and wiring for facilitating the physical media aspect of the 100 GBASE-KP4 PHY.

Figure 20:
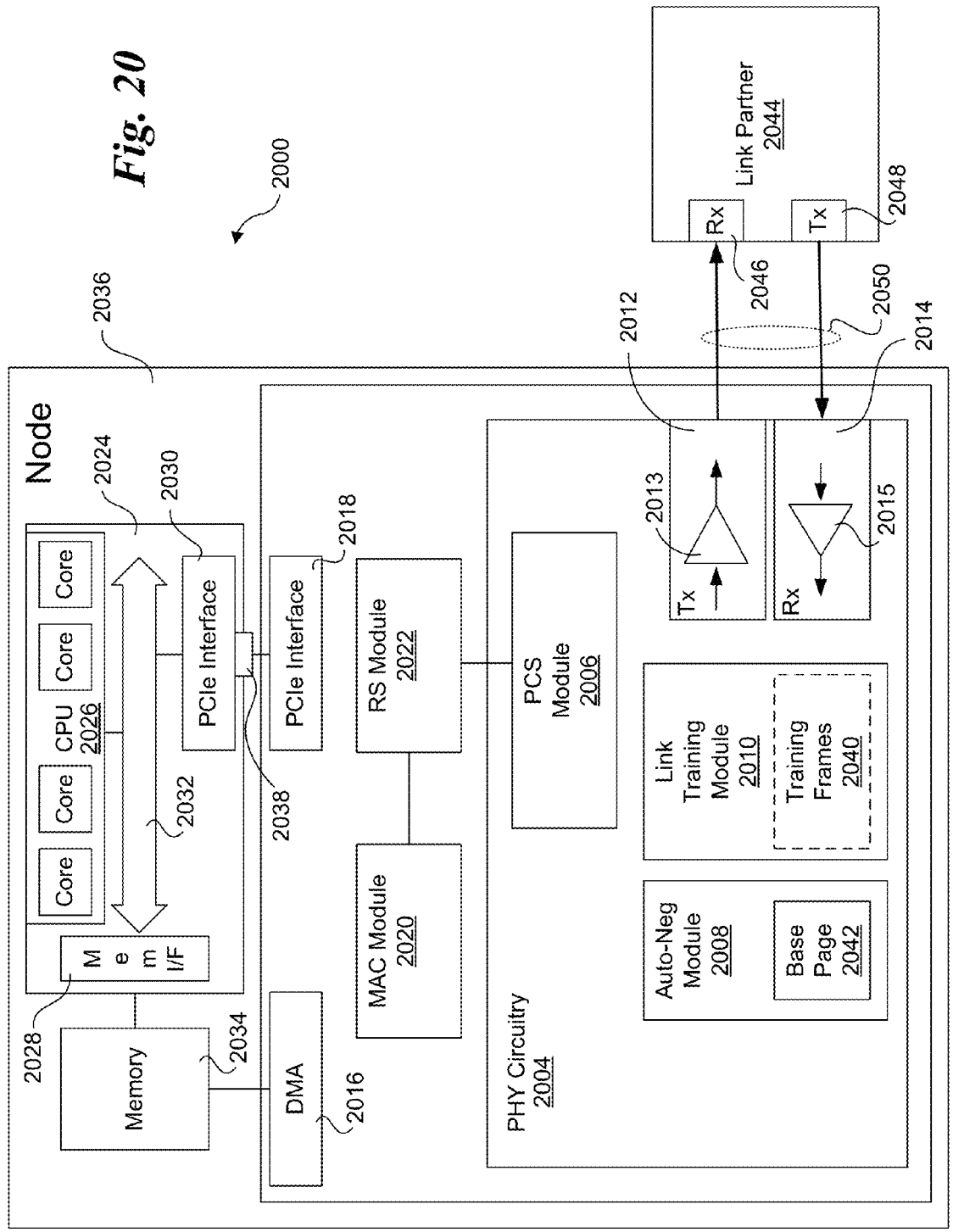
FIG. 20 is a schematic diagram illustrating an architecture for a network node employing a network chip configured to perform link training and initialization operations in accordance with the embodiments disclosed herein.

FIG. 20 shows an architecture 2000 for a network node employing a network chip 2002 configured to perform link training and initialization operations in accordance with aspects of the embodiments disclosed herein. Network chip 2002 comprises PHY circuitry 2004 including a PCS module 2006, an auto-negotiation module 2008, a link training module 2010, a transmitter port 2012 including transmitter circuitry 2013 and a receiver port 2014 including receiver circuitry 2015. Network chip 2002 further includes a DMA (Direct Memory Access) interface 2016, a Peripheral Component Interconnect Express (PCIe) interface 2018, a MAC module 2020 and a Reconciliation Sublayer (RS) module 2022. Network node 2000 also comprises a System on a Chip (SoC) 2024 including a Central Processing Unit (CPU) 2026 having one or more processor cores, coupled to a memory interface 2028 and a PCIe interface 2030 via an interconnect 2032. Memory interface 2028 is further depicted as being coupled to memory 2034. Under a typical configuration, network chip 2002, SoC 2024 and memory 2034 will be mounted on or otherwise operatively coupled to a circuit board 2036 that includes wiring traces for coupling these components in communication, as depicted by single lines connecting DMA 2016 to memory 2034 and PCIe interface 2018 to PCIe interface 2030 at a PCIe port 2038.

In one embodiment, MAC module 2020 is configured to implement aspects of the MAC layer operations performed by embodiments described herein. Similar, RS module 2022 is configured to implement reconciliation sub-layer operations performed by embodiments described herein, such as illustrated in FIG. 9*a*.

Link training module 2010 is further depicted as including training frames 2040, which are configured in accordance with the training frame embodiments disclosed herein. Auto-negotiation module 2008 is further depicted as including a base page 2042. During link initialization, auto-negotiation module 2008 is implemented for auto-negotiation of link speed and capabilities. The auto-negotiation format consists of a base-page (e.g., base page 2042), which is the first set of formatted information exchanged with the link partner, as depicted by a link partner 2044 including a receiver port 2046 and a transmitter port 2048. In one embodiment the configuration of node 2000 and link partner 2044 are similar. In one embodiment, the format of base page 2042 is in accordance with the base page format defined in IEEE 802.3bh Draft 3.1. Link training module 2010 is further configured to perform link training operations relating to initialization for a link 2050 communicatively coupled between network chip 2002 and link partner 2044 in accordance with aspects of the embodiments disclosed herein.

In one embodiment, network chip 2002 comprises a 100 Gbps Ethernet Network Interface Controller (NIC) chip. However, the circuitry and components of network chip 2002 may also be implemented in other types of chips and components, including SoCs, multi-chip modules, and NIC chips including support for multiple network interfaces (e.g., wired and wireless).

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for facilitating a transition between a link training mode and a data mode for a high-speed Ethernet link, comprising:
    transmitting training frames from a transmitter port of a first component to be received at a receiver port of a second component, the training frames being transmitted using Physical Media Attachment (PMA) framing logic and having the same length as PMA frames to be transmitted during a data mode following the training mode;
    receiving training frames transmitted from a transmitter port of the second component at a receiving port of the first component, the training frames that are received including receiver readiness status indicia identifying a readiness status of the receiver port of the second component to receive data, and countdown data; and
    employing the receiver readiness status indicia and the countdown data to facilitate the transition between the link training mode and the data mode.

2. The method of claim 1, wherein the training frames are sent such that the end of a last training frame is immediately followed by the start of a first PMA frame when transitioning from the link training mode to the data mode.

3. The method of claim 1, wherein a training frame comprises a frame marker portion, a control channel portion, and a training pattern portion, and wherein the receiver readiness status indicia and the countdown data are included in the control channel portion of the training frame.

4. The method of claim 3, wherein the control channel portion of the training frame includes a coefficient update portion and a status report portion including cells in which the receiver readiness status indicia and the countdown data are stored.

5. The method of claim 4, wherein each of the coefficient update portion and status report portion include data that is encoded using differential Manchester encoding (DME), and further wherein each of the control channel portion and status report portion include overhead bits that are selected to effect DC balance.

6. The method of claim 3, wherein the control channel portion of the training frame includes a coefficient update portion and a status report portion, and wherein separate parity bits are employed for each of the coefficient update portion and the status report portion and selected to effect DC balance.

7. The method of claim 1, wherein the training frame and PMA frame comprises a plurality of 92-bit terminated blocks (TB92), and have a length of 348 TB92.

8. The method of claim 7, wherein the training frame includes a training pattern, comprising three cycles having a length of 8191 bits, followed by a truncated fourth cycle having a length of 6523 bits.

9. The method of claim 8, wherein the training pattern comprises a 13-bit Pseudo-Random Bit Sequence (PRBS13) bit pattern and bits in the second and fourth cycles are inverted.

10. The method of claim 9, wherein a PRBS13 initial state is selected from among PRBS13 initial states that are DC balanced when used with a termination process, a Gray coding process, a precoding process and a 4-level pulse amplitude modulation (PAM4) encoding process and for which the final output of a precoder operation is '0'.

11. The method of claim 10, wherein the Ethernet link comprises a multi-lane link employing four lanes, and PRBS13 initial states are selected for respective lanes such the resulting PAM4 sequences have low cross-correlation relative to each other.

12. The method of claim 1, wherein the Ethernet link comprises a multi-lane link including multiple lanes, further comprising transmitting training frames over each of multiple lanes.

13. The method of claim 1, wherein the Ethernet link comprises a physical media implemented via wiring in one of a mid-plane or back-plane.

14. The method of claim 1, wherein the high-speed Ethernet link supports a bandwidth of 100 Gigabits per second.

15. An apparatus including a high-speed Ethernet interface having a transmitter port and a receiver port, the apparatus configured to perform operations when the apparatus is operating comprising:
    transmitting, during a link training mode, training frames from the transmitter port of the high-speed Ethernet interface to be received at a receiver port of a second apparatus, the training frames being transmitted using Physical Media Attachment (PMA) framing logic and having the same length as PMA frames to be transmitted during a data mode following the training mode;
    receiving training frames transmitted from a transmitter port of the second apparatus at the receiving port of the high-speed Ethernet interface, the training frames that are received including receiver readiness status indicia identifying a readiness status of the receiver port of the second component to receive data and countdown data; and employing the receiver readiness status indicia and the countdown data to facilitate a transition between the link training mode and the data mode.

16. The apparatus of claim 15, wherein the training frame and PMA frame comprises a plurality of 92-bit terminated blocks (TB92), and have a length of 348 TB92.

17. The apparatus of claim 16, wherein the training frame includes a training pattern, comprising three cycles having a length of 8191 bits, followed by a truncated fourth cycle having a length of 6523 bits.

18. The apparatus of claim 17, wherein the training pattern comprises a 13-bit Pseudo-Random Bit Sequence (PRBS13) bit pattern and bits in the second and fourth cycles are inverted.

19. The apparatus of claim 18, wherein a PRBS13 initial state is selected from among PRBS13 initial states that are DC balanced when used with a termination process, a Gray coding process, a precoding process and a 4-level pulse amplitude modulation (PAM4) encoding process and for which the final output of a precoder operation is '0'.

20. The apparatus of claim 15, wherein the high-speed Ethernet transmitter port is configured to implement a multi-lane link including multiple lanes, and the Ethernet transmitter port is further configured to transmit training frames over each of multiple lanes.

21. The apparatus of claim 15, wherein the high-speed Ethernet transmitter port supports a bandwidth of 100 Gigabits per second.

22. The apparatus of claim 15, wherein a training frame comprises a frame marker portion, a control channel portion, and a training pattern portion, and wherein the receiver readiness status indicia and the countdown data are included in the control channel portion of the training frame.

23. An apparatus, comprising:
Physical Layer (PHY) circuitry, including,
  a Physical Coding Sublayer (PCS) module;
  an auto-negotiation module;
  a link training module;
  a transmitter port including transmitter circuitry; and
  a receiver port including receiver circuitry;
a Media Access Control (MAC) module;
a Reconciliation Sublayer (RS) module; and
a Peripheral Component Interconnect Express (PCIe) interface;
wherein the apparatus is configured to perform operations when operating including,
  transmitting, during a link training mode, training frames via the transmitter port to a receiver port of a link partner, the training frames being transmitted using Physical Media Attachment (PMA) framing logic and having the same length as PMA frames to be transmitted during a data mode following the training mode;
  receiving training frames transmitted from a transmitter port of the link partner at the receiver port of the apparatus, the training frames that are received including receiver readiness status indicia identifying a readiness status of the receiver port of the link partner to receive data and a countdown data value; and
  employing the receiver readiness status indicia and the countdown data to facilitate a transition between the link training mode and a data mode.

24. The apparatus of claim 23, wherein the training frame and PMA frame comprises a plurality of 92-bit terminated blocks (TB92), and have a length of 348 TB92.

25. The apparatus of claim 24, wherein the training frame includes a training pattern comprising a 13-bit Pseudo-Random Bit Sequence (PRBS13) bit pattern, including three cycles having a length of 8191 bits, followed by a truncated fourth cycle having a length of 6523 bits, wherein bits in the second and fourth cycles are inverted.

26. The apparatus of claim 23, wherein the transmitter port is configured to implement a multi-lane link including multiple lanes, and the transmitter port is further configured to transmit training frames over each of multiple lanes.

27. The apparatus of claim 23, wherein the apparatus comprises a 100 Gigabits per second Ethernet Network Interface Controller.

28. A system comprising:
a chassis;
an inter-plane, mounted within the chassis, having first and second inter-plane connectors and wiring coupled therebetween configured to facilitate a 100 Gigabits per second (Gbps) Ethernet link;
a first board having a first network interface controller (NIC) including 100 Gbps Ethernet transmitter and receiver ports operatively coupled to a first board connector that is coupled to the first inter-plane connector;
a second board having a second NIC including 100 Gbps Ethernet transmitter and receiver ports operatively coupled to a second board connector that is coupled to the second inter-plane connector,
wherein the first NIC is configured to perform operations when the system is operating including,
  transmitting, during a link training mode, training frames from the transmitter port of the first NIC to the receiver port of the second NIC, the training frames being transmitted using Physical Media Attachment (PMA) framing logic and having the same length as PMA frames to be transmitted during a data mode following the training mode;
  receiving training frames transmitted from the transmitter port of the second NIC at the receiving port of the first NIC, the training frames that are received including receiver readiness status indicia identifying a readiness status of the receiver port of the second component to receive data and a countdown data value; and
  employing the receiver readiness status indicia and the countdown data to facilitate a transition between the link training mode and a data mode.

29. The system of claim 28, wherein the training frame and PMA frame comprises a plurality of 92-bit terminated blocks (TB92), and have a length of 348 TB92.

30. The apparatus of claim 29, wherein the training frame includes a training pattern comprising a 13-bit Pseudo-Random Bit Sequence (PRBS13) bit pattern, including three cycles having a length of 8191 bits, followed by a truncated fourth cycle having a length of 6523 bits, wherein bits in the second and fourth cycles are inverted.

* * * * *